United States Patent [19]
Woo et al.

[11] Patent Number: 6,125,135
[45] Date of Patent: Sep. 26, 2000

[54] SYSTEM AND METHOD FOR DEMODULATING GLOBAL POSITIONING SYSTEM SIGNALS

[75] Inventors: Richard K. T. Woo, Orange; Jose O. Quan, Lawndale; Unjeng Cheng, Arcadia, all of Calif.

[73] Assignee: Navcom Technology, Inc., Redondo Beach, Calif.

[21] Appl. No.: 09/437,779

[22] Filed: Nov. 10, 1999

Related U.S. Application Data

[60] Provisional application No. 60/109,909, Nov. 25, 1998.

[51] Int. Cl.$^7$ .............................. H04B 1/707; H04B 1/69
[52] U.S. Cl. .......................... 375/130; 375/148; 375/150; 342/352; 701/213; 701/214
[58] Field of Search ..................................... 375/130, 148, 375/150; 342/352, 357; 701/213, 214; 380/2, 9, 49, 59

[56] References Cited

U.S. PATENT DOCUMENTS

| | | | |
|---|---|---|---|
| 4,928,106 | 5/1990 | Ashjaee et al. | 342/352 |
| 4,968,981 | 11/1990 | Sekine et al. | 342/356 |
| 4,972,431 | 11/1990 | Keegan | 375/1 |
| 5,134,407 | 7/1992 | Lorenz et al. | 342/352 |
| 5,414,729 | 5/1995 | Fenton | 375/209 |
| 5,535,278 | 7/1996 | Cahn et al. | 380/49 |
| 5,576,715 | 11/1996 | Litton et al. | 342/357 |
| 5,621,416 | 4/1997 | Lennen | 342/357 |
| 5,736,961 | 4/1998 | Fenton et al. | 342/357 |
| 5,903,654 | 5/1999 | Milton et al. | 380/49 |

*Primary Examiner*—Don N. Vo
*Attorney, Agent, or Firm*—Pennie & Edmonds LLP

[57] ABSTRACT

A GPS receiver uses the energy of the L1 and L2 GPS satellite signals to track the phase of the L1 and L2 P-code and the carrier phase of the L2 signal. The in-phase channel of the L1 signal, after L1 carrier demodulation with the aid of the publicly known C/A code, is first correlated with the P-code from a P-code generator in the L1 channel of the receiver. The correlation output is filtered over two W-bit periods, using an integrate-and-dump (I&D) filter, to determine whether a polarity change has occurred. Similarly the in-phase and quadrature channels of the received L2 Y-code signal are correlated with the P-code from the P-code generator in the receiver L2 channel and I&D filtered over the corresponding period of two W-bits. Polarity transitions between the two W-bits over the I&D integration period are detected by a threshold comparison with the I&D output of the L1 punctual P-code correlation signal. If a polarity change has occurred, the L1 and L2 I&D outputs are not used for L2 carrier demodulation. When there is no polarity change, the I&D output of the L1 in-phase Punctual P-code correlation is combined with the L2 in-phase Punctual P-code correlation in accordance with the L1 and L2 signal power ratio. This summed signal is multiplied with the I&D output of the L2 quadrature channel early-late P-code correlation to obtain a product signal that provides an estimate of the L2 carrier phase.

28 Claims, 15 Drawing Sheets

SYSTEM AND METHOD FOR DEMODULATING GLOBAL POSITIONING SYSTEM SIGNALS

CROSS-REFERENCE TO RELATED APPLICATIONS

This application claims the benefit of U.S. Provisional application Ser. No. 60/109,909 filed Nov. 25, 1998.

FIELD OF THE INVENTION

The present invention relates generally to Global Positioning System ("GPS") satellite signal receivers, and, more particularly, to systems and methods of synchronizing, with high precision, a locally generated L2 carrier signal with an L2 signal received from a GPS satellite.

BACKGROUND OF THE INVENTION

The global Positioning System (GPS), also called NAVSTAR, consists of a plurality of GPS satellites. The orbits of the GPS satellites are arranged in multiple planes, in order that signals can be received from at least four GPS satellites at any point on or near the earth. The satellite transmissions are controlled and accurately synchronized by ground stations; and the receiver can measure the range of each satellite from the timing of the received code, which is derived from the received RF signals. The orbital parameters of the GPS satellites are determined with a high degree of accuracy from fixed ground stations and are relayed to the user through the GPS downlink signals. In navigation applications of GPS, the latitude, longitude, and altitude of any point close to the earth can be calculated from the times of propagation of the electromagnetic signals from four or more of the spacecraft to the unknown location. A measured range, known as "pseudorange", between the GPS receiver at the unknown location and the four satellites within view is determined based on these propagation times. The measured range is referred to as pseudorange because there is generally a time difference or offset between timing clocks on the satellites and the GPS receiver clock. Thus, for three dimensional position determinations, at least four satellite signals are needed to solve for four unknowns, i.e., the time offset together with the three dimensional positions of the satellites.

Each GPS satellite transmits two spread-spectrum signals in L band, known as L1 and L2 with separate carrier frequencies at 1575.42 and 1227.6 MHZ, respectively. Two signals, each with a different center frequency, are required in order to eliminate errors that arise due to delays of the satellite signals through the ionosphere. Since the ionospheric delay is inversely proportional to the square of the carrier frequency, the ionospheric delay can be estimated and removed through pseudorange measurements on both L1 and L2 frequencies.

The satellite signals are modulated by two pseudorandom codes: one referred to as the coarse acquisition (C/A) code and the other referred to as the precision (P) code. Both codes are unique to each satellite. This allows the L-Band signals from the plurality of GPS satellites to be individually identified and separately processed in a receiver. The P-code has a 10.23 MHZ clock rate and is used to modulate the L1 quadrature phase and L1 inphase carriers generated within the satellite. The P-code repeats approximately once every week. In addition, the L1 signal of each satellite includes an inphase carrier modulated by the C/A code, which has a 1.023 MHZ chip rate and repeats every 1 millisecond. The C/A code carrier and the P-code carrier are in phase quadrature with respect to each other. Each carrier is also modulated by a slowly varying 50 bits-per-second data stream, defining the satellite ephemeris, satellite clock corrections, and other GPS information.

In the GPS receiver, the signals corresponding to the known P-code and C/A code may be generated in the same format as in the satellite. The L1 and L2 signals from a given satellite are demodulated by aligning the phases, i.e., adjusting the timing, of the locally generated codes with the satellite signal. To achieve time alignment the locally generated code replicas are correlated with the received signal until the resultant correlation output is maximized. Since the time at which each code chip is transmitted from the satellite is defined, the time of receipt of a particular chip can be used as a measure of the transit time or range to the satellite. Since the C/A and P-codes are unique to each satellite, a specific satellite may be identified based on the results of correlations between the received signals and the locally generated C/A and P-code replicas.

Since the C/A code has a short repetition cycle (1 millisecond), C/A code acquisition can be accomplished rapidly without knowledge of GPS time, which is related the code state of the transmitted signal at the time of signal acquisition. Accordingly, acquisition of the PDC code is generally accomplished by first acquiring the C/A code signal, since there exists a predefined timing relationship between the C/A code and the P-code unique to each satellite. This timing relationship is given in the Hand-Over-Word (HOW) in the navigation message of the C/A code signal. Once the C/A code is acquired, L1 carrier demodulation of the L1 signal can be accomplished with suppressed carrier demodulation techniques such as the Costas loop. If extreme accuracy in the quantity being measured by the receiver is not required, use of the L1 carrier alone may allow satisfactory "carrier wave measurements". However, in kinematic applications, when high-resolution carrier-wave measurements are desired to be made or when measurements are desired to be made quickly, the L2 carrier signal also can be utilized. The use of both L1 and L2 carrier phase is desired for carrier phase ionospheric delay estimation and removal. The availability of both L1 and L2 carriers allow the formation of the so-called "widelane" frequency that is the difference frequency between L1 and L2 and is useful for rapid carrier phase ambiguity resolution.

Kinematic or carrier-phase differential techniques are a natural outcome of the use of GPS for surveying applications. Rather than making use of the code measurements that can be adversely affected by multipath (signal reflections), the reconstructed carrier-phase measurements are used in surveying and kinematic applications. The high accuracy that can be obtained from carrier-phase measurements is related to the relative wavelengths involved. The "chip" rate of the C/A code has a wavelength of approximately 300 meters. The corresponding "chip" rate of the P code has a wavelength of approximately 30 meters. The wavelength of the L1 carrier is 19 cm, and the wavelength of the L2 carrier 24.4 cm. A common rule of thumb is that a measurement can be made to a precision that is about $\frac{1}{40}$th of the wavelength. Thus, a carrier-phase measurement can be obtained that is much more accurate than the code measurements. However, the carrier-phase measurement has one very significant disadvantage compared to the code measurements. Specifically, the carrier-phase measurement can be used as an accurate range measurement only if the correct number of whole cycles of the carrier signal in transit between the satellite and the receiver can be determined in some manner.

An equivalent requirement for use in a differential application is to determine the difference in the number of whole cycles at the reference receiver and the kinematic receiver. The source of the problem is that each cycle of the carrier signal is identical and it is not obvious when the particular cycle being received was transmitted from the satellite.

Several methods of determining the cycle ambiguity have been developed. The first method used in surveying applications was simply to collect a sufficient amount of data while stationary so that the change in carrier phase (integrated Doppler) could be used to compute a position in three dimensions that would be accurate to at least one half a wavelength. Thus, if L1 carrier phase measurements were being used, the integrated Doppler position would need to be accurate to 9.5 centimeters in each of the three dimensions. Once the desired accuracy is achieved, the computed range to the satellite can be used to resolve the whole-cycle ambiguity value. Once the whole-cycle ambiguity values are set, the position can be recomputed. Typically, this revised solution results in differential positions accurate to less than one centimeter.

Recently, other more sophisticated methods have been developed and used to resolve the whole-cycle ambiguities in the carrier-phase measurements for the moving or "kinematic" receiver. Like the survey applications, they depend upon a static reference receiver that is used to measure the systematic errors in the code and carrier measurements and transmit them in real time to the kinematic receiver. Typically, these ambiguity-resolution methods make use of both the code and carrier measurements in a multi step process. First, the code measurements are used to obtain a differential position whose accuracy is on the order of 1 to 5 meters. Next, an uncertainty region or volume of space is defined around the code differential position that has a high probability of containing the true solution. Finally, combinations of whole-cycle ambiguity values are chosen for each carrier-phase measurement such that the resultant carrier-phase solution both (1) lies within the uncertainty volume and (2) has a small RMS residual. The requirement of a small RMS residual means that measurements to at least five satellites are required because at least one redundant measurement is needed in order to compute residuals. If more than one combination of whole-cycle ambiguity values meets the requirements, the process is repeated with the next set of measurements. The motion of the satellites ensures that the residuals will grow on any solution that is not correct. Only the one true solution should continue to yield small RMS residuals as the satellites move.

Two elements of the above description show a significant advantage accrues with the use of longer carrier wavelengths. First, the number of combinations of whole-cycle ambiguities that will have solutions within any given uncertainty volume decreases as the cube of the wavelength involved increases. Second, the closer a false solution is to the true position, the greater the amount of satellite motion is required to cause the residuals of that solution to grow an equal amount. Both of these factors favor the use of the L2 carrier over the L1 carrier since the L2 wavelength is almost 30 percent longer than the L1 wavelength. However, the major motivation to obtain L2 carrier-phase measurements arises for another reason. Specifically, the difference measurements obtained by subtracting the L2 carrier-phase measurements from the L1 measurements have a wavelength of 86 centimeters that corresponds to the wavelength of the difference frequency of L1 minus L2. This wavelength is 4.5 times longer than the L1 wavelength and means that there will be approximately $(4.5)^3$ or about 100 times fewer combinations of whole-cycle ambiguities positioned within the same uncertainty volume. Furthermore, the required satellite motion needed to cause the RMS residuals to exceed the elimination threshold will be at least 4.5 times smaller. In summary, there is a very large benefit to the whole-cycle ambiguity resolution process when carrier-phase measurements can be obtained on the L2 carrier.

Although both the C/A and P-code unique to each satellite are known, each satellite is provided with the capability of modulating its P-code with a secret anti-spoofing (A/S) code prescribed by the United States Government. This secret code is intended to prevent a terrorist or enemy from generating a signal simulated to appear as a signal transmitted from a GPS satellite that could be used to "spoof" or fool a GPS receiver into computing a false position. A security code, the W code not available to civilian users, is modulo-2 added with the P codes on both L1 and L2 signals, thereby encrypting the L1 and L2 P-code signals. Since the W-code is not publicly known it will provide the anti-spoofing function and protect military users from interpreting enemy signals, which may be identical to the publicly known P-code, as valid satellite signals. When this A/S modulation is employed, the combination of P-code with W-code is referred to as the Y-code. From measurements using high gain dish antennas, it has been empirically determined that the W-code chip rate is approximately 500 KHz, or roughly $\frac{1}{20}^{th}$ of the P-code chip rate.

Since L2, unlike L1, has the P-code component only, its access is denied to all users without knowledge of the W-code. This has severe impacts to survey users and carrier phase differential (or kinematic) users whose achievable accuracy will be degraded since dual frequency ionospheric delay correction cannot be obtained without the L2 signal, and rapid carrier phase ambiguity resolution cannot be implemented with developed techniques using the difference frequency between L1 and L2 (the widelane Frequency) that has a wavelength that is 4.5 times larger than L1.

While the L1 signal includes a quadrature phase carrier modulated by the P-code and an inphase carrier modulated by the C/A code, the L2 signal is only modulated by the P code. Accordingly, when the A/S code is employed a standard receiver with no access to the Y-code would not be able to recover the L2 code and carrier phase information with standard correlation techniques. This loss of access to the L2 signal presents two distinct problems to some user groups. First, it means that there is no means to measure and correct for the ionospheric refraction effects on the pseudorange measurements. More significantly, it can be a serious problem to the survey user and the carrier-phase differential or "kinematic" user, both of whom desire to achieve accuracies below 1 centimeter, because they would not be able to demodulate the L2 carrier phase reliably and accurately without knowledge of the classified Y-code.

The large benefit from L2 carrier-phase measurements has resulted in the development of several methods for obtaining the required L2 carrier phase measurements even in the event that the A/S code is turned on, i.e., when the P-code is encrypted to become Y-code, and access by nonmilitary users to the L2 signal is denied. A number of techniques have been suggested for obtaining the L2 carrier phase even in the presence of the A/S code encryption.

In the first technique described by Ashjaee et al (U.S. Pat. No. 4,928,106) the received L2 signal is multiplied by itself, or squared, in order to remove its biphase data modulation imposed by the secret W-code. The squaring process generates a single-frequency output signal, the phase of which can be measured when A/S is turned on. However, there are two significant disadvantages of the squaring process. First, the output frequency is twice the original carrier frequency and, hence, the wavelength is half of the L2 carrier. Such a reduction in wavelength increases the number of whole cycle ambiguities in carrier wave measurements. The second, even more serious, disadvantage is that the squaring process must be performed in a bandwidth broad enough to include most of the spread-spectrum energy of the incoming signal (~20 MHZ). This admits significantly more noise energy into the receiver, thereby significantly degrading the signal-to-noise ratio relative to techniques of carrier recovery relying on a direct correlation process.

In a second technique, commonly known as cross-correlation, the incident L2 signal is multiplied by the L1 signal rather than being squared. Thus, the wavelength is not cut in half as it is in the squaring process. When the L1 and L2 signals are transmitted from the satellite, the P-code modulation of the two signals is synchronized. However, the ionospheric refraction causes a longer delay in the L2 signal than in the L1 signal. Thus, in order to maximize the signal, the L1 signal must be delayed by a variable amount in order to align the P code modulation of the two signals. Since the cross-correlation must still be done in the spread spectrum bandwidth, significant degradation remains. The degradation is somewhat less, however, as a consequence of the increased transmitted energy in the L1 signal relative to the L2 signal.

A third technique, known as P code aided squaring, is described by Keegan (U.S. Pat. No. 4,972,431) to reduce the signal to noise ratio degradation inherent in the techniques described above. Because the Y-code is a composite of both P-code and W-code modulation, it is possible to remove the P-code component of the received signal and reduce its bandwidth to that of the W-code by multiplying it with a locally generated replica of the P code and filter the product signal to the W-code bandwidth of approximately +/−500 KHz. The local P-code phase is adjusted until a strong demodulated signal appears at the filter output. The narrower bandwidth signal is squared to remove the W-code modulation for carrier recovery. Although leading to an improved signal to noise ratio (SNR) as compared to the squaring and cross-correlation techniques described above, this technique results in a doubling of the L2 frequency in the squaring process, thereby reducing the observable wavelength by one half. Again, such a wavelength reduction results in a commensurate increase in the number of whole cycle ambiguities to be resolved. In addition, filtering of the product signal of L2 and the local P-code is performed by an analog bandpass filter, which is not the optimal filter for the W-code signal. The optimal filter will be an integrate-and-dump filter over the W-code bit time if the W-code timing is available. This performance of this technique is thus not the optimal achievable.

In a fourth technique for obtaining the L2 carrier phase in the presence of the A/S code encryption, described by Lorenz et al. (U.S. Pat. No. 5,134,407), the L1 and L2 signals are initially correlated with locally generated P-code and carrier signals. The resultant signals are then integrated for a duration estimated to be the period of the classified W-code. The W-bit period varies and is approximately 20 or 22 P-chips in duration. The W-bit timing relationship is related to the P-code phase and can be observed from a GPS downlink using a high gain antenna even though the W-bit data is not publicly known. Based on these integration processes separate estimates are made of the unknown W-code on a bit-by-bit basis. In a particular embodiment an estimated W-bit polarity obtained on the L2 channel is cross correlated with the L1 signal after decorrelation is performed using the local P-code replica. The resultant L1 signal can then be coherently code tracked. Similarly, an estimated polarity of the W-code bit obtained on the L1 channel is cross correlated with the L2 signal after decorrelation using the local P-code replica. Full wavelength carrier tracking can then be performed on the resultant L2 signal since the modulation of the unknown W-code is removed in the cross-correlation process. Although allowing for an improved SNR relative to other methods of L2 carrier recovery, the method described by Lorenz does not yield optimal accuracy as a consequence of the "hard decision" made in estimating the values for the individual W-code bits. That is, each bit is specifically determined to be one of two binary values by comparing the results of each integration process with a predefined threshold, thereby resulting in less than optimal SNR.

In a fifth technique, described by Litton, Russell and Woo (U.S. Pat. No. 5,576,715), an optimal processing technique for L2 demodulation is derived based on Maximum A Posteriori estimation of the L1 W-bits on a bit-by-bit basis, combined with corresponding estimation of the L2 W-bits. This further improves the signal-to-noise performance of the technique described by Lorenz et al. In a particular embodiment, the band limited L2 signal, after correlation with the punctual P-code generated by the P-code generator in the L2 channel, is mixed with the local carrier reference to produce the inphase and quadrature signals proportional to cos ($\phi$) and sin ($\phi$), respectively, where $\phi$ represents the phase difference between the received L2 signal and a locally generated replica thereof. The inphase and quadrature channels are integrated over an integration period that approximates the W-bit period. Each estimate of a W-code bit on the inphase, i.e., the cosine channel, is combined with the hyperbolic tangent of a corresponding L1 channel W-code bit estimate, weighted by the factor 1.4142, which is selected to compensate for the greater signal strength (~3 dB) of the received L1 signal relative to the received L2 signal. The resultant sum is multiplied with the L2 quadrature (i.e., sine) channel integrated over the corresponding W-code bit period to obtain an estimate of L2 carrier phase error. The resulting carrier phase error estimate is used to adjust the locally generated L2 carrier phase. The phase error estimate consists of two components: one component proportional to sin ($\phi$) that results from multiplying the hyperbolic tangent of the L1 W-bit estimate with the L2 inphase channel integrate and dump output, and the second component proportional to sin ($2\phi$) that results from multiplying the L2 inphase channel integrate and dump output with the L2 quadrature channel integrate and dump output. The addition of the component that is proportional to sin ($\phi$) allows full-wavelength carrier recovery and prevents the locally generated L2 carrier from becoming locked one-half carrier cycle out of phase with the received L2 carrier.

In both techniques described by Lorenz et al. and by Litton et al. estimation of the unknown W-code bits is performed on a bit-by-bit basis. The W-code bit estimates, used to derive the L2 carrier phase error, are performed at a rate of 500 KHz approximately. Since the W-code bit periods are relatively short (~2 microseconds), the SNR of the W-code bit estimates is very low, e.g., −17 dB for a received C/No of 40 dB-Hz. This results in significant degradation in L2 carrier recovery performance as compared to what is achievable when there is no A/S W-code modulation.

SUMMARY OF THE INVENTION

The present invention provides a technique to improve the signal to noise performance of L2 carrier recovery, when the classified Y-code is present, by forming estimates of each pair of W-code bits. Since the duration of these bit pairs is twice that of a single bit, signal to noise of the estimate of a pair of W-bits is 3 dB improved over that of a single bit when there is no data polarity change between the two W-bits.

More specifically, the present invention provides a GPS demodulator configured to receive a GPS signal that includes modulated C/A code, L1 P-code, L2 P-code and encrypting W-code signals. The demodulator includes an L1 P-code generator configured to generate first and second L1 P-code signals that are local replica signals of the L1 P-code of the GPS signal and a first demodulator configured to demodulate the GPS signal based on, in part, the first and second L1 P-code signals, to thereby generate a first and second demodulated L1 P-code signals. The demodulator further includes a first pair of integrate-and-dump (I&D) filters configured to generate a first integrated L1 P-code signal by integrating the first demodulated L1 P-code signal and configured to generate a second integrated L1 P-code signal by integrating the second demodulated L1 P-code signal during a predetermined integration period. The demodulator also includes a first thresholding module configured to generate a first switch control signal by comparing the first integrated L1 P-code signal to a first predetermined threshold value to determine whether the encrypting W-code changed polarity during the integration period, and a first switch configured to output a first adjusting signal based on a signal derived from the first and second integrated L1 P-code signals and based on the first switch control signal. The L1 P-code generator is further configured to be adjusted based on a signal derived from the first adjusting signal, to thereby accurately generate the first L1 P-code signal which tracks the L1 P-code of the GPS signal. In a preferred embodiment, the integration period is substantially equal to that of two bit periods of the encrypting W-code.

If desired, the first switch is further configured to output a null signal as the first adjusting signal when the encrypting W-code changed its polarity during the integration period. Alternatively, the demodulator also includes a threshold determination module configured to generate the first threshold value based on an estimated carrier-to-noise (C/No) ratio value of the L1 P-code of the GPS signal.

The present invention further provides a method of processing the GPS signal that includes modulated C/A code, L1 P-code, L2 P-code and encrypting W-code signals. The method includes the step of demodulating the GPS signal based on, in part, first and second L1 P-code signals that are locally generated replica signals of the L1 P-code of the GPS signal, to thereby generate first and second demodulated L1 P-code signals, separately integrating the first and second demodulated L1 P-code signals over a predetermined integration period, to thereby generate first and second integrated L1 P-code signals, and comparing the first integrated L1 P-code signal to a first predetermined threshold value to determine whether the encrypting W-code has changed its polarity during the integration period. The method further includes the step of adjusting the first L1 P-code signal based on the first and second integrated L1 signals and based on whether the encrypting W-code changed polarity during the integration period, to thereby accurately generate the first L1 P-code signal which tracks the L1 P-code of the GPS signal.

BRIEF DESCRIPTION OF THE DRAWINGS

Additional objects and features of the invention will be more readily apparent from the following detailed description and appended claims when taken in conjunction with the drawings, in which

DESCRIPTION OF THE PREFERRED EMBODIMENTS

Figure 1:
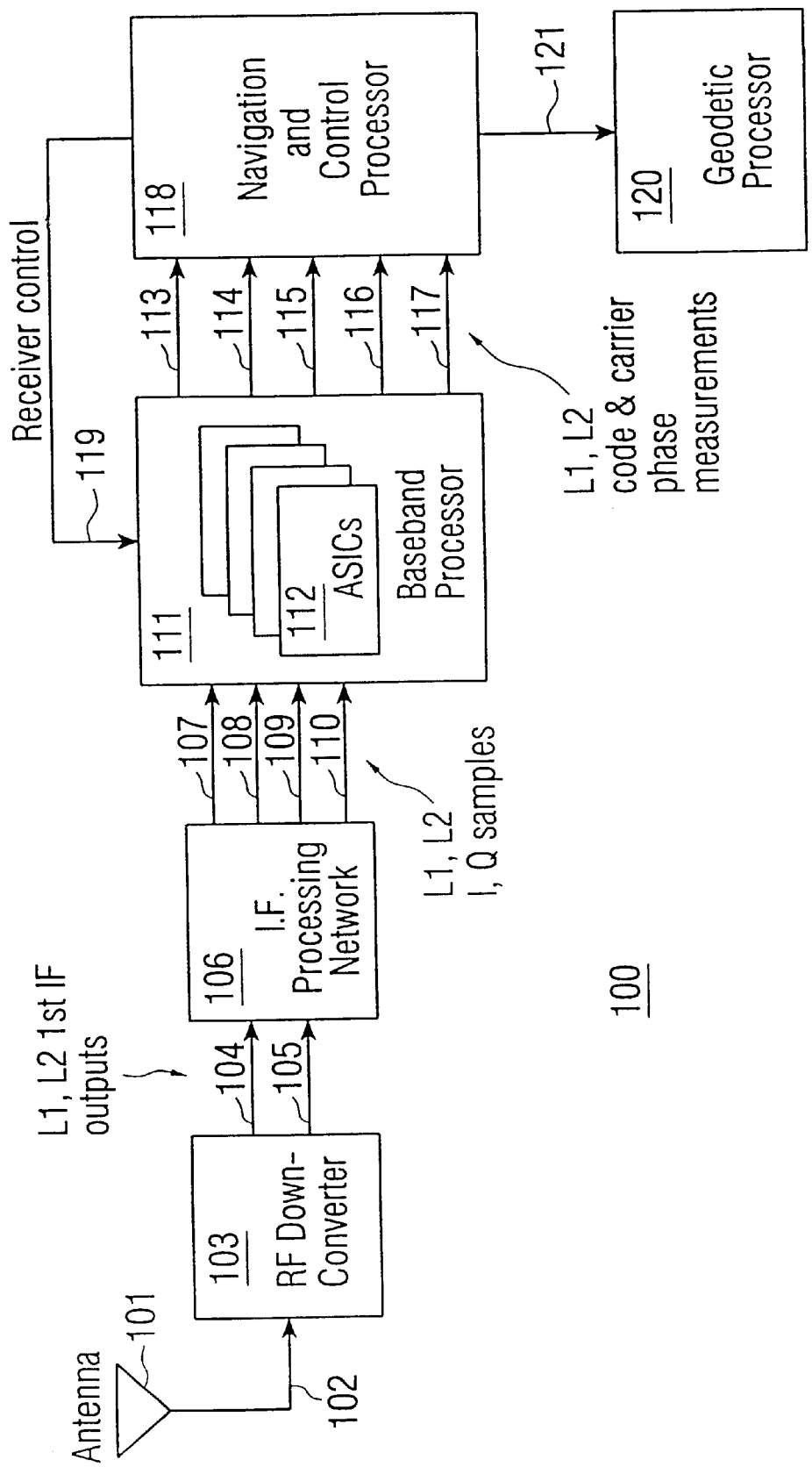
FIG. 1 shows a block diagram representation of a Global Positioning System (GPS) receiver configured in accordance with the present invention.

Referring to FIG. 1, a global positioning system (GPS) receiver 100 of the present invention includes a dual-frequency GPS antenna 101, an RF down-converter 103, and an IF Processing Network 106, a basedband processor 111 and a navigation and control processor 118.

The dual-frequency GPS antenna 101 receives both L1 (1575.42 MHz) and L2 (1227.6 MHz) signals from the GPS satellites. In particular, the antenna 101 receives the signals from the GPS satellites within its view, thereby providing a near hemispherical coverage of the GPS satellites. The received signals are supplied to the RF down-converter 103. The RF down-converter 103 converts the L1 and L2 signals to their respective intermediate frequency (IF) signals 104, 105 which are supplied to the IF processing network 106.

The IF processing network 106 performs filtering and gain control on the IF signals 104, 105. It should be noted that the IF processing network 106 may include a pair of processing units in order to separately process the L1 and L2 signals. Furthermore, the IF processing network 106 may be implemented with analog circuits, digital circuits or a hybrid thereof. In one exemplary embodiment, the IF processing network 106 may process its input signal with analog circuits and then convert analog signals into digital signals using a set of analog to digital converters. In this embodiment, the IF processing network 106 generates quadrature sample A/D outputs 107, 108, 109, and 110 of L1 and L2, which are supplied to the baseband processor 111.

The baseband processor 111 may include at least one Application Specific Integrated Circuit (ASIC) 112 that is configured to generate GPS observable data based on the quadrature sample A/D outputs 107, 108, 109, 110 and a receiver control signal 119 received from the navigation and control processor 118. The GPS observable data include: L1 C/A code pseudorange 113, L1 carrier phase pseudorange 114, L1 P-code pseudorange 115, L2 P-code pseudorange 116, and L2 carrier phase pseudorange 117. These generated GPS observable data are supplied to the navigation and control processor 118. It should be noted that the GPS receiver 100 includes a sufficient number of baseband processors 111 to process L1 and L2 signals received from at least GPS satellites.

The navigation and control processor 118 determines navigational and positional data based on the GPS observable data supplied from the baseband processor 111. As discussed above, the navigation and control processor generates the receiver control signal 119 and provides it to the baseband processor 111. The receiver control signal 119 may include acquisition and tracking mode control signals.

In one embodiment, a geodetic processor 120 is also included in the GPS receiver 100 for further application specific processing, e.g., RTK processing, and accuracy improvements. In this embodiment, code based navigation solution and GPS timing 121 signals are derived in the navigation and control processor 118 and supplied to the geodetic processor 120 for further processing.

Figure 2:
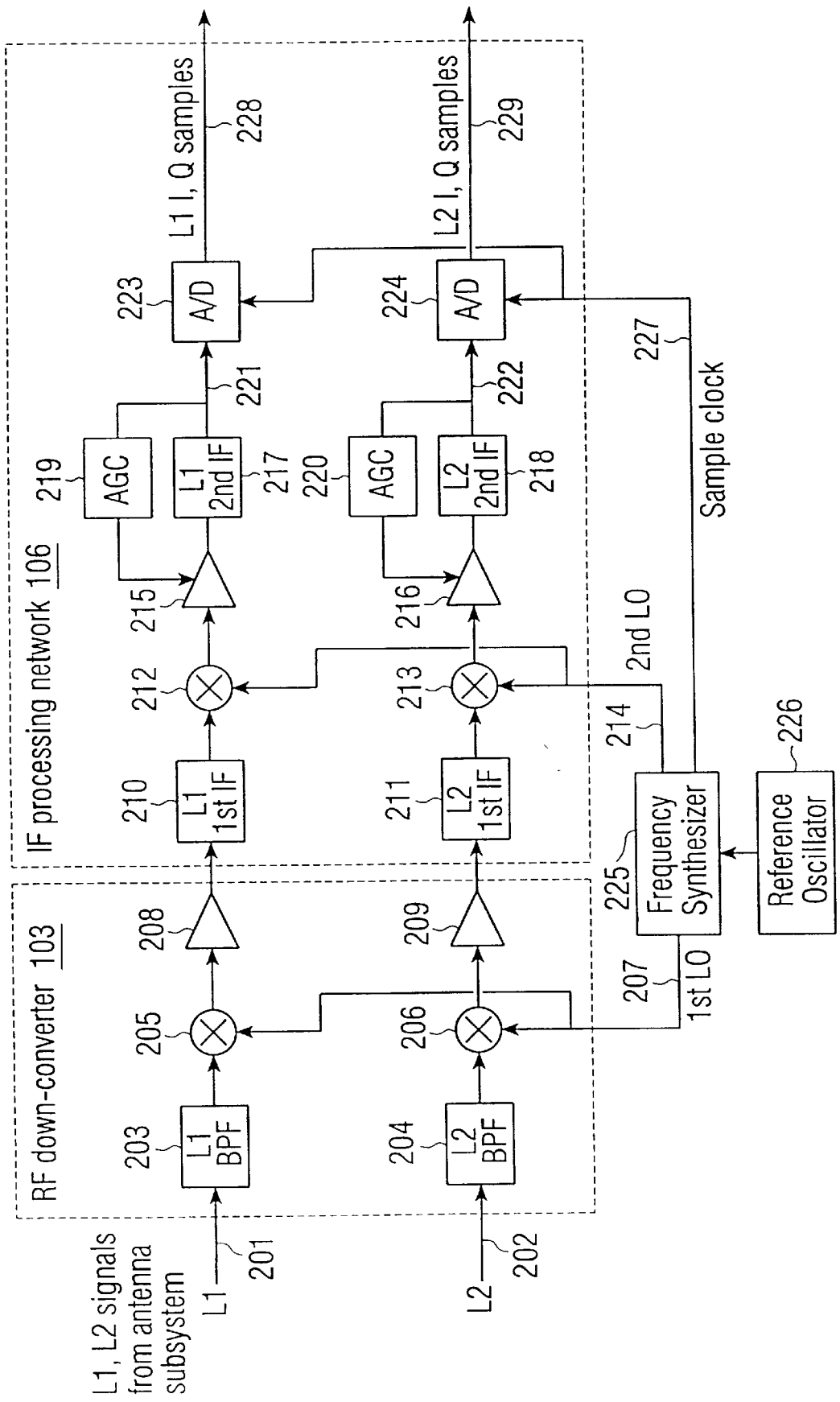
FIG. 2 is a block diagram of an exemplary RF down-converter and IF processing network for inclusion within the GPS receiver of the present invention.

Referring to FIG. 2, a preferred embodiment of the RF down-converter 103 includes a pair of bandpass filters 203, 204 configured to receive the L1 and L2 signals from the antenna 101, respectively. Output signals of the L1 and L2 bandpass filters 203, 204 are supplied to a pair of multipliers 205, 206. The multipliers 205, 206 mix their respective input signals from the L1 and L2 bandpass filters with a first local oscillator signal 207 from a frequency synthesizer 225, respectively. The frequency synthesizer 225 is configured to output required local oscillator frequencies from a signal having a reference frequency provided from a reference oscillator 226. The mixed signals from the pair of mixers 205, 206 are amplified by a pair of amplifiers 208, 209, respectively, thereby generating L1 and L2 amplified signals. The amplified signals are in turn supplied to the IF processing network 106.

Still referring to FIG. 2, a preferred embodiment of the IF processing network 106 includes first L1 and L2 IF filters 210, 211 which receive the L1 and L2 amplified signals from the RF down-converter 103, respectively. The first IF filters 210, 211 provide bandwidth control, image rejection, and rejection of summed frequencies and higher order local oscillator harmonics in the L1 and L2 amplified signals. Output signals of the first IF filters 210, 211 are supplied to a pair of multipliers 212, 213, respectively. The multipliers 212, 213 mix the output signals from the first IF filters 210, 211 with a second local oscillator signal 214 from the frequency synthesizer 225, thereby further down-converting the L1 and L2 signals to a second IF frequency. Output signals of the mixers 212, 213 and are amplified by amplifiers 215 and 216, respectively, and filtered by second L1 and L2 IF filters 217, 218, respectively. In addition, one of automatic gain control circuits 219, 220 is provided to each of the second L1 and L2 IF filters 217, 218. The automatic gain control circuits 219, 220 adjust gains of the amplifiers 215, 216, respectively, according to envelope levels of the output signals of the first and second IF filters 217, 218, respectively. Output signals 221, 222 of the second L1 and L2 IF filters 217, 218 are supplied to a pair of analog-to-digital converters (A/Ds) 223, 224, respectively. Each A/D 223, 234 generates digital samples in phase quadrature with respect to each other, representing I and Q outputs of the IF signals 221, 222. An A/D sample clock signal 227 is also generated by the frequency synthesizer 225. The frequency of the final IF signals 221, 222 must be compatible with the selected clock frequency of the A/Ds 223, 224, e.g., A/D samples are separated by a quarter of IF cycles in time, so that alternate A/D samples correspond to quadrature (I and Q) outputs of the final IF signals. It should be noted that the A/D converters 223, 224 are not required if a processor following the IF processing network 106, i.e., the baseband processor, is an analog circuit rather than a digital circuit.

Figure 3:
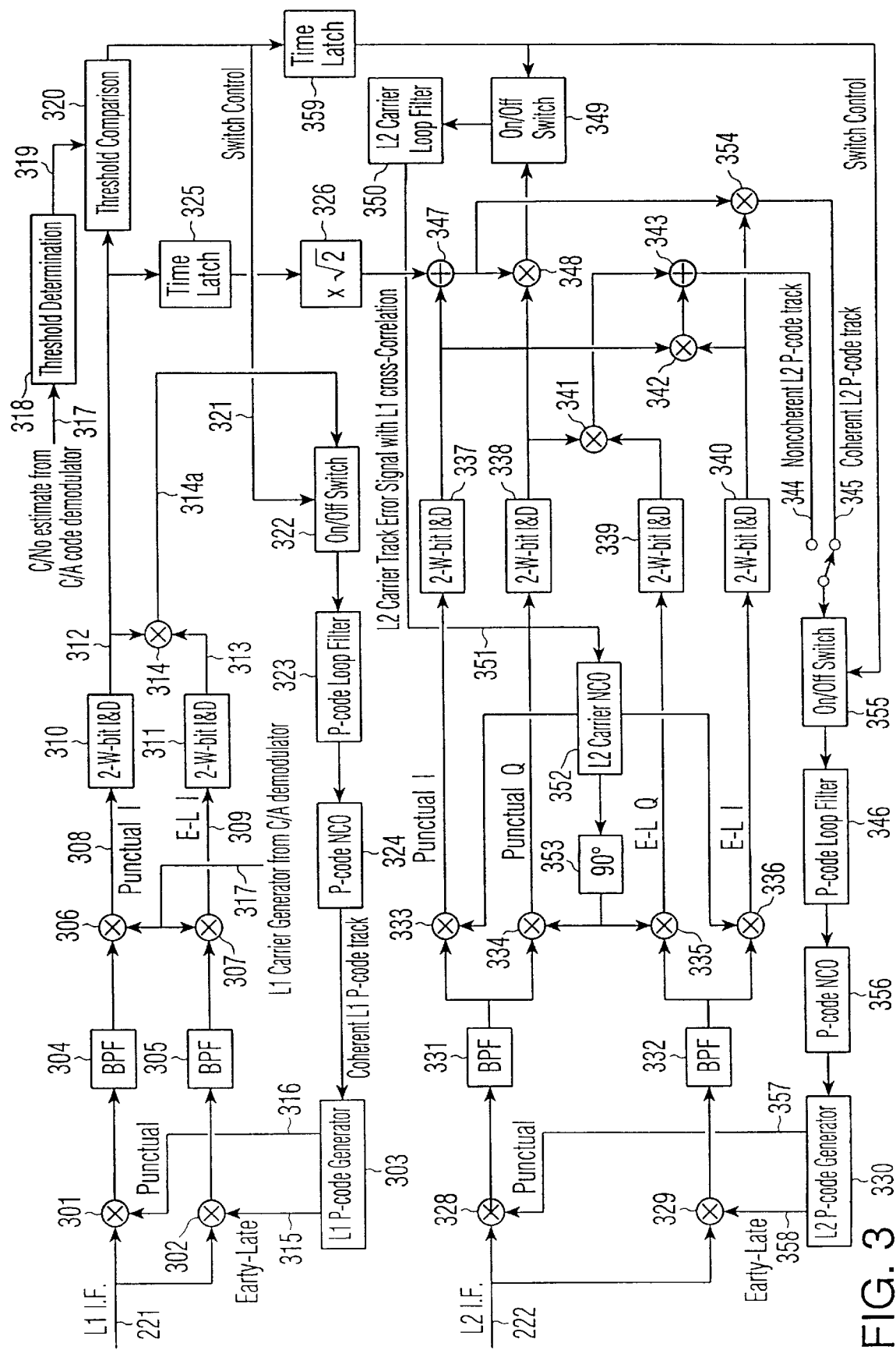
FIG. 3 depicts a functional block diagram showing the overall preferred implementation for L1 P-code tracking, L2 P-code tracking, and L2 carrier tracking using the cross-correlation technique of the present invention.

Now referring to FIG. 3, there is shown a preferred embodiment of the baseband processor 111. More specifically, FIG. 3 illustrates an overall cross-correlation processing for L1 P-code tracking, L2 P-code tracking, and L2 carrier tracking networks implemented with analog circuits.

The L1 P-code tracking network includes an L1 P-code generator 303 that outputs local replica signals of the P-code signals including a locally generated "punctual" replica 316 of the P-code signal and an early-late signal (E-L) replica of the P-code signal 315, i.e., the difference between "early" and "late" versions of the locally generated P-code signal.

A pair of multipliers 301, 302 receives the L1 IF signal 221 and one of punctual signal 316 and the E-L signal 315 from the L1 P-code generator 303, respectively. In other words, multiplier 301 correlates the L1 IF signal 221 with the punctual replica signal 316 of the P-code signal generated from the L1 P-code generator 303, thereby outputting a punctual P1 IF correlation signal. The multiplier 302 correlates the L1 IF signal 221 with the E-L replica signal 315 of the P-code signal generated from the L1 P-code generator 303, thereby outputting an E-L P1 IF correlation signal.

A pair of bandpass filters 304, 305 are configured to receive the punctual and E-L P1 IF correlation signals from the pair of multipliers 301, 302, respectively, and to filter the received signals to a bandwidth commensurate to that of the encryption W-code.

A multiplier 306 receives and correlates the punctual P-code correlation signal and a local replica signal of the L1 carrier signal 317, thereby generating an L1 inphase punctual P-code correlation signal 308. Another multiplier 307 receives and correlates the E-L P-code correlation signal and the local replica of the L1 carrier signal 317, thereby generating an L1 inphase E-L P-code correlation signal 309.

An L1 C/A code channel demodulator (not shown in FIG. 3) generates the local replica signal 317 of the L1 carrier signal. In an exemplary embodiment, a conventional Costas loop is used in the L1 C/A code demodulator to recover the L1 carrier signal after despreading the received L1 signal with the publicly known C/A code signal. As mentioned above, in the L1 signal from the GPS satellite, the C/A and P codes are modulated on the inphase and quadrature channels of the L1 carrier signal, respectively. The recovered L1 carrier from the C/A code demodulator is utilized to provide a coherent phase reference for the L1 P(Y) code demodulator.

A pair of two W-bit period integrate-and-dump (I&D) filters 310, 311 receives the L1 inphase punctual signal 308 and L1 inphase E-L correlation signal 309 from the multipliers 306, 307, respectively. The I&D filters 310, 311 then integrate the received signals over integration periods substantially equal to the duration of two bits of the encrypting W-code signal, thereby generating an integrated L1 inphase punctual P-code signal 312 and an integrated L1 inphase E-L P-code signal 313, respectively.

Here, it should be noted that the integrated L1 inphase E-L P-code signal 313 is proportional to the time difference between the local replica P-code signal generated from L1 P-code generator 303 and the P-code signal of the incoming L1 inphase signal from the GPS satellite, modified by the polarity of the W-bits. In addition, the sign of the integrated L1 inphase punctual P-code signal 312 indicates an estimate of the W-bit polarity. These relationships among the signals are present when there is no bit polarity transition between two sequential W-bits during the I&D filter integration period. When the polarity of the W-bit change occurs within the two sequential W-bit integration periods, the integrated L1 inphase punctual signal 312 and the integrated L2 inphase E-L P-code signal 313 are substantially equal to that of a zero signal. Hence, the integration values in those periods will not be used to create code and carrier timing error estimates.

A multiplier 314 receives the integrated L1 inphase punctual signal 312 and the integrated L2 inphase E-L P-code signal 313 and multipies the received signals with each other, thereby generating a product signal 314a. This product signal 314a, when there is no data polarity change between the two W-bits over the I&D integration period, is an unbiased estimate of the time difference between the incoming L1 P-code and the local replica P-code signal, which is not modified by the W-bit polarity as discussed above. Therefore, the product signal 314a is used to control the timing of the locally generated P-code when there is no data polarity change detected. It should be noted that this arrangement is substantially similar to making a soft decision on the integrated L1 inphase punctual signal 312 as compared with a hard decision that generates only the sign of this signal 312. Further, the arrangement of the present invention provides added SNR performance for L1 P-code signal tracking. However, since code tracking of GPS signals is more robust than carrier tracking, improvement in SNR performance for L1 P-code signal tracking is not critical.

Thus, for high carrier to noise ratio (C/No) conditions, an alternate embodiment includes a mixer to multiply the integrated L1 inphase E-L P-code correlation signal 313 with the sign, i.e., hard decision, of the integrated L1 inphase punctual P-code correlation signals 312. This alternate embodiment has the advantage of simplifying the multiplier circuit required to form the L1 P-code delay error signal.

In order to determine whether or not the polarity of the W-bit changed within the I&D integration period, a threshold comparison circuit 320 is provided. The threshold comparison circuit 320 detects the W-bit polarity change by comparing the absolute value of the integrated L1 inphase punctual P-code signal 312 to a threshold value 319 generated by a threshold determination circuit 318. The polarity change in the W-bit data is indicated by the absolute value falling below the threshold value. When the absolute value exceeds the threshold, no polarity change is indicated. The threshold value is determined optimally and adaptively according to an estimate value 317 of the received carrier-to-noise ratio (C/No) of the L1 signal observed in the L1 C/A code demodulator. The optimal threshold value for each received C/No value is computed off-line with computer simulation and stored in a read-only memory (ROM) table in threshold determination circuit 318. The proper threshold setting is looked up in the ROM table according to the C/No received on L1.

The threshold comparison circuit 320 provides a switch-control signal 321 that controls an on/off switch 322. More specifically, if no data polarity change is detected by the threshold comparison circuit 320, the product signal 314a that estimates the L1 P-code delay error in the above described embodiment will be input to an L1 P-code tracking loop filter 323. An output signal of the loop filter 323 is then utilized to control an L1 P-code numerical controlled oscillator (NCO) 324, which provides timing for the local L1 P-code generator 303. If a data polarity change is detected by the threshold comparison circuit 320, the product signal 314a will not be input to the loop 323 filter and the L1 P-code tracking loop is temporarily gated off by the on/off switch 322. It is reasonable to assume that the classified W-code would have characteristics of a pure random sequence. For such a characteristic, the gated-off duty cycle of the loop is approximately 50%, and would not negatively affect the tracking performance of the code and carrier tracking loops involved under almost all dynamic conditions considering the high bit rate (~500 KHz) of the W-code. In the preferred implementation, L1 P-code tracking is implemented only in the coherent mode because the L1 carrier phase is available from the Costas loop in the C/A code demodulator.

Still referring to FIG. 3, the L2 P-code tracking network includes a pair of L2 P-code multipliers 328, 329 operatively coupled with a pair of L2 P-code bandpass filters 331, 332, respectively, and an L2 P-code generator 330. Each of the L2 P-code bandpass filters 331, 332 is, operatively connected to a pair of L2 carrier multipliers 333, 334, 335, 336, which, in turn, are operatively coupled to an L2 carrier generator 352. The L2 carrier multipliers 333, 334, 335, 336 are also operatively coupled to L2 integrate and dump filters (I&D) 337, 338, 339, 340, respectively. The L2 I&D filters 337, 338, 339, 340 are, in turn, operatively coupled to an L2 P-code feed back circuit.

The L2 P-code generator 330 outputs local replica signals of the L2 P-code signals including a locally generated "punctual" replica signal 357 of the L2 P-code signal and an early-late (E-L) replica signal 358 of the L2 P-code signal.

The pair of multipliers 328, 329 receives the L2 IF signal 222 from the IF processing network 106 in FIG. 2 and the output signals from the L2 P-code generator 330. The multiplier 328 correlates the L2 IF signal 222 with the punctual replica signal 357 of the L2 P-code signal generated from the L2 P-code generator 330, thereby outputting a punctual P2 IF correlation signal. The multiplier 329 correlates the L2 IF signal 222 with the E-L replica signal 358 of the L2 P-code signal generated from the L2 P-code generator 330, thereby outputting an E-L P2 IF correlation signal.

The pair of bandpass filters 331, 332 are configured to receive the punctual and E-L P2 IF correlation signals from the pair of multipliers 323, 329, respectively, and to filter the received signals to a bandwidth commensurate with the estimated bandwidth of the classified W-code signal.

An L2 carrier numerically controlled oscillator (NCO) 352 outputs a local replica signal of the L2 carrier signal. A 90° phase shifter 353 is coupled to the L2 carrier NCO to generate a 90° phase shifted signal of the local replica signal of the L2 carrier signal.

The four multipliers 333, 334, 335, 336 receive output signals from the bandpass filters 331, 332, the L2 carrier NCO 352 and the 90° phase shifter 353 to generate:

1. L2 inphase punctual P-code correlation signal (labeled as Punctual I), which is proportional to the correlation of the incoming P-code with the local P-code, multiplied by cos ($\phi$), where $\phi$ is the difference between the incoming L2 carrier and the local L2 carrier reference;
2. L2 quadrature punctual P-code correlation signal (labeled as Punctual Q), which is proportional to the correlation of the incoming P-code and the local P-code, multiplied by sin ($\phi$);
3. L2 inphase early-late P-code correlation signal (labeled as E-L I), which is proportional to the correlation of the incoming P-code with the Early-Late version of the local P-code, multiplied by cos ($\phi$); and
4. L2 quadrature early-late P-code correlation signal (labeled as E-L Q), which is proportional to the correlation of the incoming P-code with the Early-Late version of the local P-code, multiplied by sin ($\phi$).

The four I&D filters 337, 338, 339, and 340 receive the Punctual 1, Punctual Q, E-L I, and E-L Q signals, respectively. The received signals are individually I&D filtered by the I&D filters 337, 338, 339, and 340 over two W-bit periods determined by the local P-code timing, which is established following a non-coherent tracking made of L2 P-code, as described below.

Similar to the L1 P-code generator 303, the L2 P-code generator 330 is adjusted based on the integrated signals, i.e., the Punctual I, Punctual Q, E-L I, and E-L Q signals. Unlike the L1 P-code tracking, however, the P2 code tracking is divided into two different phases. First, the L2 P-code tracking is initially performed non-coherently before the L2 carrier signal is recovered based on a non-coherent mode L2 P-code error signal 344 which is formed as a sum of two product terms. The first product term is a product of outputs of the two W-bit period I&D filters 337 and 340 generated by a multiplier 342. The second product term is a product of outputs of the two W-bit period I&D filters 338 and 339 generated by a multiplier 341. These terms are added together by an adder 343. The sum 344, the non-coherent mode L2 P-code error signal 344, is input to the L2 P-code tracking loop filter 346 through an on-off switch 355, provided that no data polarity change is detected, over the two adjacent W-bits in the I&D period. If a data polarity change is detected the sum 344 is not input to the loop filter 346. This is achieved similar to the L1 P-code tracking by the on/off switch 355. In other words, the integrated L1 inphase punctual P-code signal 312 is compared with the threshold value 319 by the threshold comparison circuit 320.

The ionospheric delay is inversely proportional to the square of the carrier frequency. Since the L2 frequency is lower than L1, the L2 P-code is always delayed relative to the L1 P-code. In order to compensate the delay of the L2 P-code, the switch-control signal 321 is time latched by a latch 359 and provided to the on/off switch 355 to gate on or off the sum 344 over corresponding 2 W-bit periods based on data polarity changes. The L2 P-code tracking loop, similar to the L1 P-code tracking loop, is temporarily gated off when a data polarity change is detected. An output of the L2 P-code loop filter 346 is input to an L2 P-code NCO 356, which provides timing for the L2 P-code generator 330.

After the L2 carrier is recovered, the L2 P-code tracking loop commences to the coherent tracking mode. In the coherent tracking mode, the L2 P-code error signal 345 is a product of two signals, i.e., an output of a multiplier 354. The first signal is an output of the two W-bit I&D filter 340. The second signal is a linear combination of: (i) a time latched value of the integrated L1 inphase punctual P-code signal 312; and (ii) the output of the I&D filter 337, which is the L2 inphase Punctual P-code correlation signal integrated over two W-bit periods. The integrated L1 inphase punctual P-code signal 312 is multiplied by a weighting constant (which is substantially equal to 1.4142 or $\sqrt{2}$, and is under processor control) by a multiplier 326 before it is summed with the output of the two W-bit I&D filter 337. The weighting constant is commensurate with the 3 dB difference in the GPS L1 and L2 signals. The L2 P-code error signal 345 is gated into the P-code tracking loop filter 346 only when no data polarity change over the two W-bit period is detected. The loop is gated off when a data polarity change is detected. This arrangement, similar to L1 coherent P-code tracking described previously, is equivalent to making soft decisions based on the outputs of the two W-bit I&D filters 310 and 337, and provides added signal-to-noise (SNR) performance for L2 P-code coherent tracking. For high C/No situations, in an alternate embodiment, the output of the I&D filter 340 is multiplied with the sign of the time latched integrated L1 inphase punctual P-code signal 312, i.e., hard decision. This alternate embodiment provides the advantage of simplifying the multiplier circuit required to form the L2 P-code delay error signal 345.

Still referring to FIG. 3, the L2 carrier tracking network includes the L2 carrier NCO 352 which is controlled by an L2 carrier phase error estimate signal 351. The L2 carrier phase error estimate signal 351 is formed as a product of two terms. The first term is a sum of (i) the time latched value of integrated L1 inphase punctual P-code signal 312; and (ii) the output of I&D filter 337, which is the L2 inphase Punctual P-code correlation signal integrated over 2 W-bit periods. The integrated L1 inphase punctual P-code signal 312 is again optimally weighted against the I&D filter 337 output of the L2 inphase punctual P-code correlation signal according to a power ratio of the L1 and L2 signals from the GPS satellite. This term represents a soft decision estimate of the data modulation of the 2 W-bit period when there is no data polarity change between the adjacent W-bits. In the preferred implementation the weighting constant is normally $\sqrt{2}$, similar to the coherent P1 tracking loop implementation described above. This reflects the specified 3 dB power advantage of the L1 signal over L2 in the GPS satellite transmission.

The second term is the output of I&D filter 338, which is the L2 quadrature punctual P-code correlation signal integrated over two W-bit periods. The product signal provides an unbiased estimate of the phase error $\phi$, where $\phi$ is the phase difference between the incoming L2 carrier and the local L2 carrier reference. The L2 phase error estimate signal is input to the L2 carrier tracking loop filter 350 when there is no data polarity change detected between the two W-bits over the I&D period considered. An on/off switch 349 is provided preceding the L2 carrier loop filter 350 to gate on or off the input thereto according to the presence or absence of data polarity change. Similar to the L1 or L2 P-code tracking loop configurations, data polarity change is detected with respect to integrated L1 inphase punctual P-code signal 312. The decision made based on threshold comparison of the integrated L1 inphase punctual P-code signal 312 is again time latched by the latch 359, and used to control the switch 349 over corresponding two W-bit periods in the L2 signal.

The above described L2 recovery embodiment offers two distinct advantages in L2 carrier recovery in the presence of the unknown W-code modulation on both L1 and L2 P(Y) code channels: a) SNR improvement with the I&D filter over two W-bit periods instead of one and optimally combining of signal energies in both L1 and L2 for L2 carrier recovery; and b) full wavelength carrier recovery.

The SNR improvement is desired in L2 carrier recovery with the W-code modulation because conventional cross-correlation techniques utilized to recover the L2 carrier, when the anti-spoofing W-code is turned on, suffer sizable demodulation losses as compared with a conventional phase locked loop operation. By contrast, the present invention provides SNR improvements obtained through the longer period of integration of the L1 and L2 signals (two W-bit periods instead of one). The enhancement in SNR in tracking the L2 carrier also significantly improves the cycle slip problem stemming from the sizable demodulation loss of the conventional cross-correlation techniques.

Full wavelength carrier recovery is desired to be performed for the carrier phase for kinematic operations used in precise positioning applications. The carrier phase error signal is generated as the product of the two W-bit periods integration of the L2 quadrature punctual P-code correlation, which is proportional to $D \sin (\phi)$, and the sum of the two W-bit periods integrations of the L2 inphase punctual P-code correlation and the L1 inphase punctual P-code correlation weighted by $\sqrt{2}$, which are proportional to $D \cos (\phi)$ and $D \sqrt{2}$, respectively, where $\phi$ is the L2 carrier phase error to be estimated, and D is the data polarity of the W-bits over the I&D filter integration period. The product signal, which provides an estimate of $\phi$, is consequently proportional to $\frac{1}{2} \sin 2\phi + \sqrt{2} \sin\phi$, and the data modulation D is removed. The presence of the $\sqrt{2}\sin\phi$ component prevents the locally generated L2 carrier from becoming locked at one half carrier cycle out of phase with the received L2 carrier.

It should be noted that the FIG. 3 and corresponding description of the present invention depicts analog embodiments. FIGS. 4–12 illustrate digital embodiments of the present invention. The present invention, therefore, can be implemented in several different ways. It can be implemented with circuits that are mostly analog. It can be implemented with circuits that are mostly digital (e.g., in ASICs). It can also be implemented with software algorithms designed to perform the above described functions in a digital signal processor (DSP). Yet, it can also be implemented with any combination of analog, digital and DSP circuits.

The following description is related to generation of a W-bit clock signal which drives the I&D filters described above. W-bit timing is observed to relate to the P-code phase. Even though the data pattern of W-bits is unknown to the nonmilitary GPS receiver manufacturers, the relationship between W-bit timing and P-code phase is observable on GPS signals through the use of a high gain antenna. More specifically, it has been observed that the duration of each W-bit is approximately 20 P-chips in length. Further, it has been deduced (Reference: U.S. Pat. No. 5,134,407, Lorenz et al., "Global Positioning System Digital Processing Technique", July 1992) that the W-bit duration is not uniform, but rather it repeats in a pattern that is synchronous and repeats with the X1A epoch of the P-code. The patterns consists of "M" W-bits with bit time of "2A" P-code chips in duration, followed by "N" W-bits with bit time of "2B" P-code chips in duration. Further, 2A×M+2B×N=4092. Detail circuits showing W-bit timing generation for L1 and L2 are shown in FIG. 4 and FIG. 5.

Figure 4:
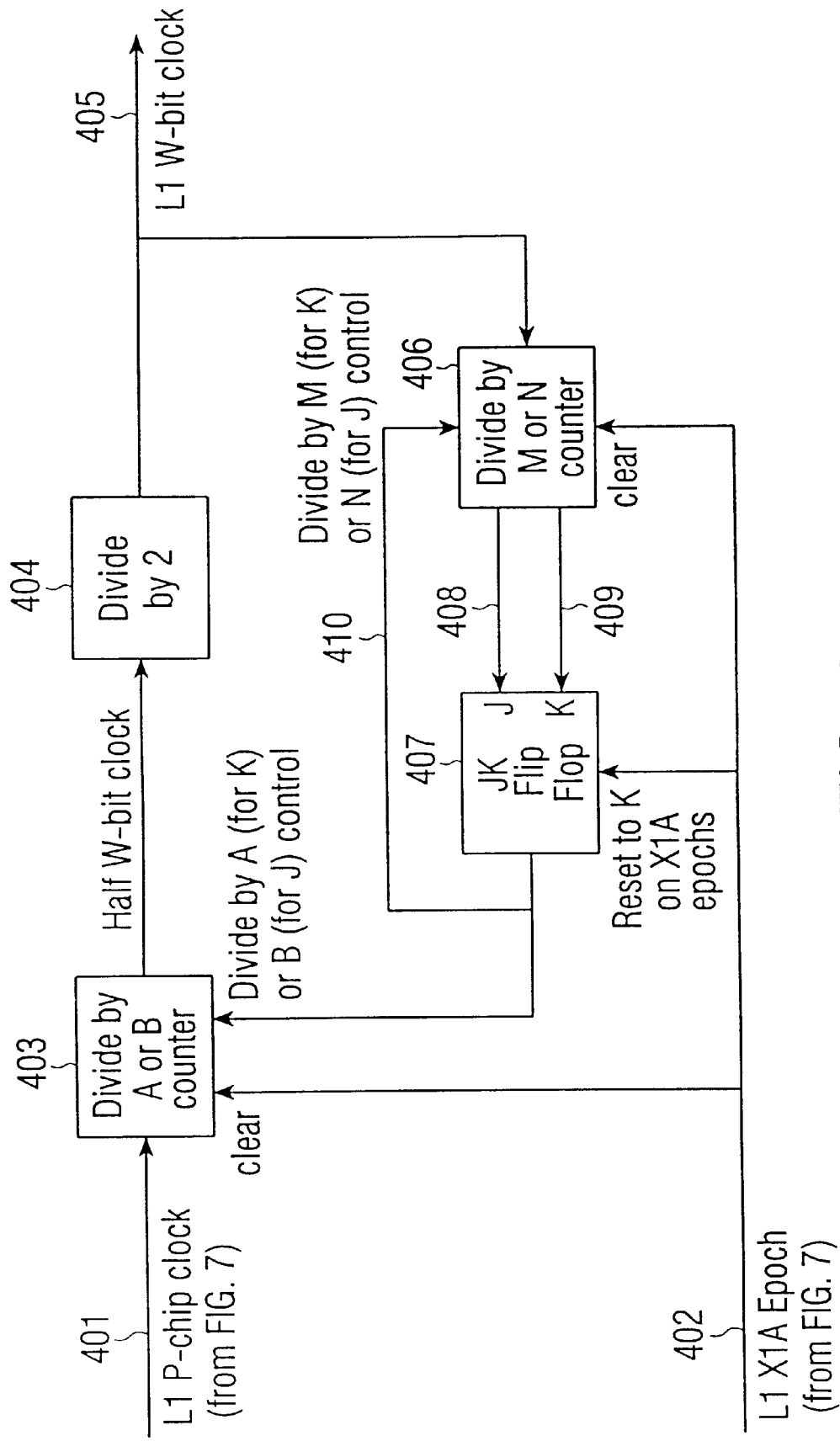
FIG. 4 depicts a block diagram of an L1 channel W-bit timing generator.

Now referring to FIG. 4, the local L1 P-code clock 401 is divided by either A or B, depending on the state of a J-K flip flop 407 and a divide-by-A-or-B-counter 403. A half-W-bit clock is generated for every A P-code chips if the flip flop 407 is at state K, and for every B P-code chips if the flip flop 407 is at state J. The half-W-bit clock from counter 403 is divided by 2 at counter 404, which then outputs W-bit clock signals 405. The J-K flip flop 407 is reset to state K and the divide-by-A-or-B-counter 403 is cleared at each epoch beginning, which is marked by the L1 X1A epoch signal 402, of an X1A cycle (4092 P-code chips). Thus, the divide-by-A-or-B-counter 403 will be synchronous with the X1A epoch and starts to divide the L1 P-code clock 401 by A at the beginning of each X1A cycle. The W-bit clock 405 is counted either by M or N, depending on the state of the J-K flip flop 407, by the divide-by-M-or-N counter 406. It is counted by M when the J-K flip flop 407 is at state K, and by N when the J-K flip flop 407 is at state J. When a count of M is reached, a signal 408 will be generated by counter 406 to command the J-K flip flop to change to state J. Further, when a count of N is reached, a signal 409 will be generated by counter 406 to command the J-K flip flop to change to state K. Thus, the L1 P-code clock 401 is divided by, alternately, A for M times, followed by B for N times, starting with each X1A epoch, to generate the half-W-bit clock and W-bit clocks synchronously with the X1A cycle. The divide-by-M-or-N counter 406 is cleared at the L1 X1A epoch by the L1 X1A epoch signal 402.

Figure 5:
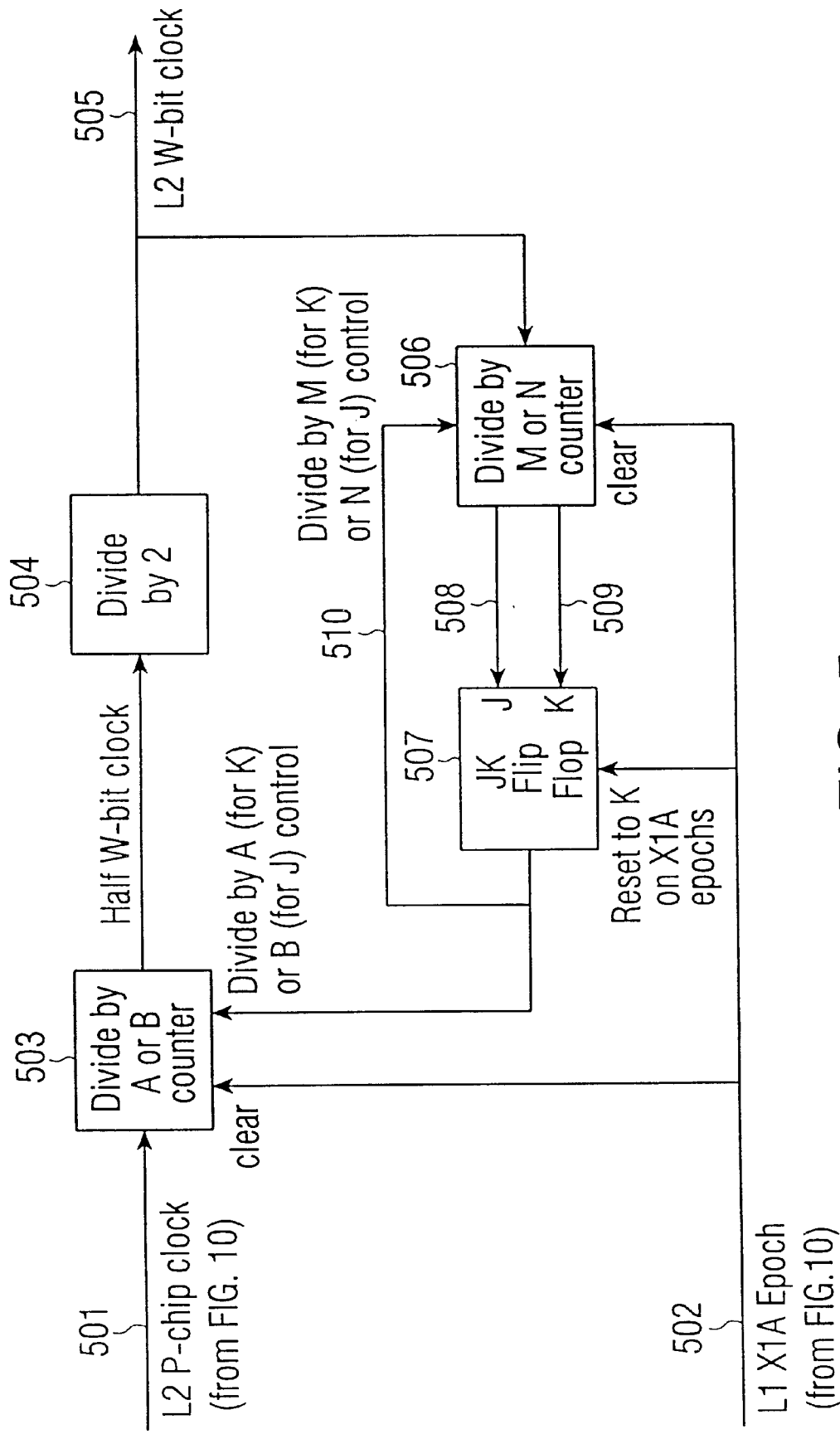
FIG. 5 depicts a block diagram of an L2 channel W-bit timing generator.

Referring to FIG. 5, a local L2 P-code clock 501 is divided by either A or B, depending on the state of a J-K flip flop 507, and a divide-by-A-or-B-counter 503. A half-W-bit clock is generated for every A P-code chips if the flip flop 507 is at state K, and for every B P-code chips if the flip flop 507 is at state J. The half-W-bit clock from counter 503 is divided by 2 at counter 504, which then outputs the W-bit clock 505. The J-K flip flop 507 is reset to state K and the divide-by-A-or-B-counter 503 is cleared at each epoch beginning of an X1A cycle (4092 P-code chips), which is marked by the L2 X1A epoch signal 502. Thus, the divide-by-A-or-B-counter 503 will be synchronous with the X1A epoch and starts to divide the L2 P-code clock 501 by A at the beginning of each X1A cycle. The W-bit clock 505 is counted either by M or N, depending on the state of the J-K flip flop 507, at the divide-by-M-or-N counter 506. It is counted by M when the J-K flip flop 507 is at state K, and by N when the J-K flip flop 507 is at state J. When a count of M is reached, a signal 508 will be generated by counter 506 to command the J-K flip flop to change to state J. Further, when a count of N is reached, a signal 509 will be generated by counter 506 to command the J-K flip flop to change to state K. Thus, the L2 P-code clock 501 is divided by, alternately, A for M times, followed by B for N times, starting with each X1A epoch, to generate the half-W-bit clock and W-bit clocks, synchronously with the X1A cycle. The divide-by-M-or-N counter 506 is cleared at the L2 X1A epoch by the L2 P-code X1A epoch signal 502.

Figure 6:
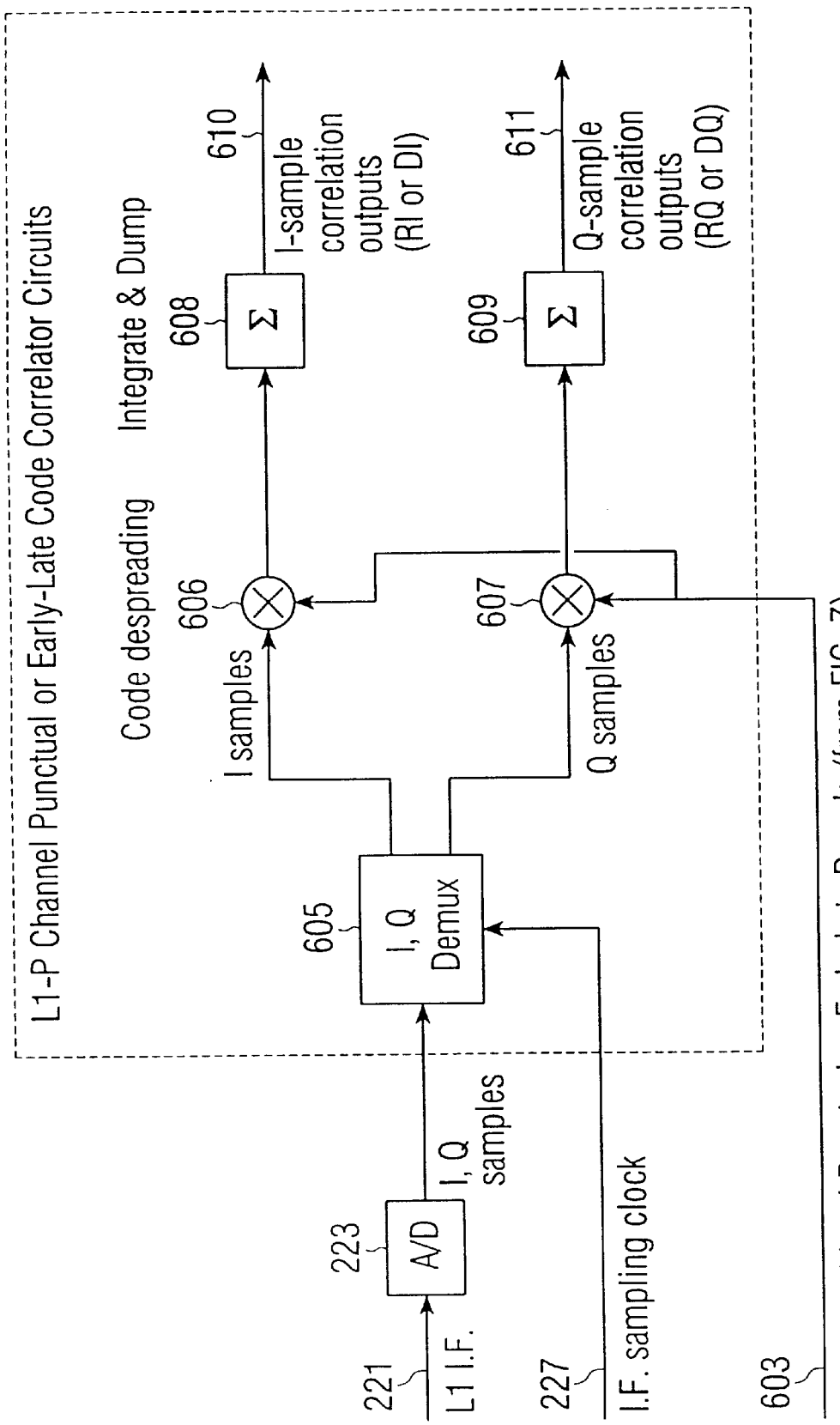
FIG. 6 shows a block diagram of a preferred implementation of the punctual and early-late L1-P code correlator.

FIG. 6 shows a block diagram of a preferred embodiment of the L1 punctual and early-late P code correlators. The embodiment shown in FIG. 6 represents a digital embodiment of the analog functions 301, 302, 304, and 305 of FIG. 3. As discussed above in connection with FIG. 2, the L1 second IF signal 221 is sampled by the A/D converter 223.

Figure 7:
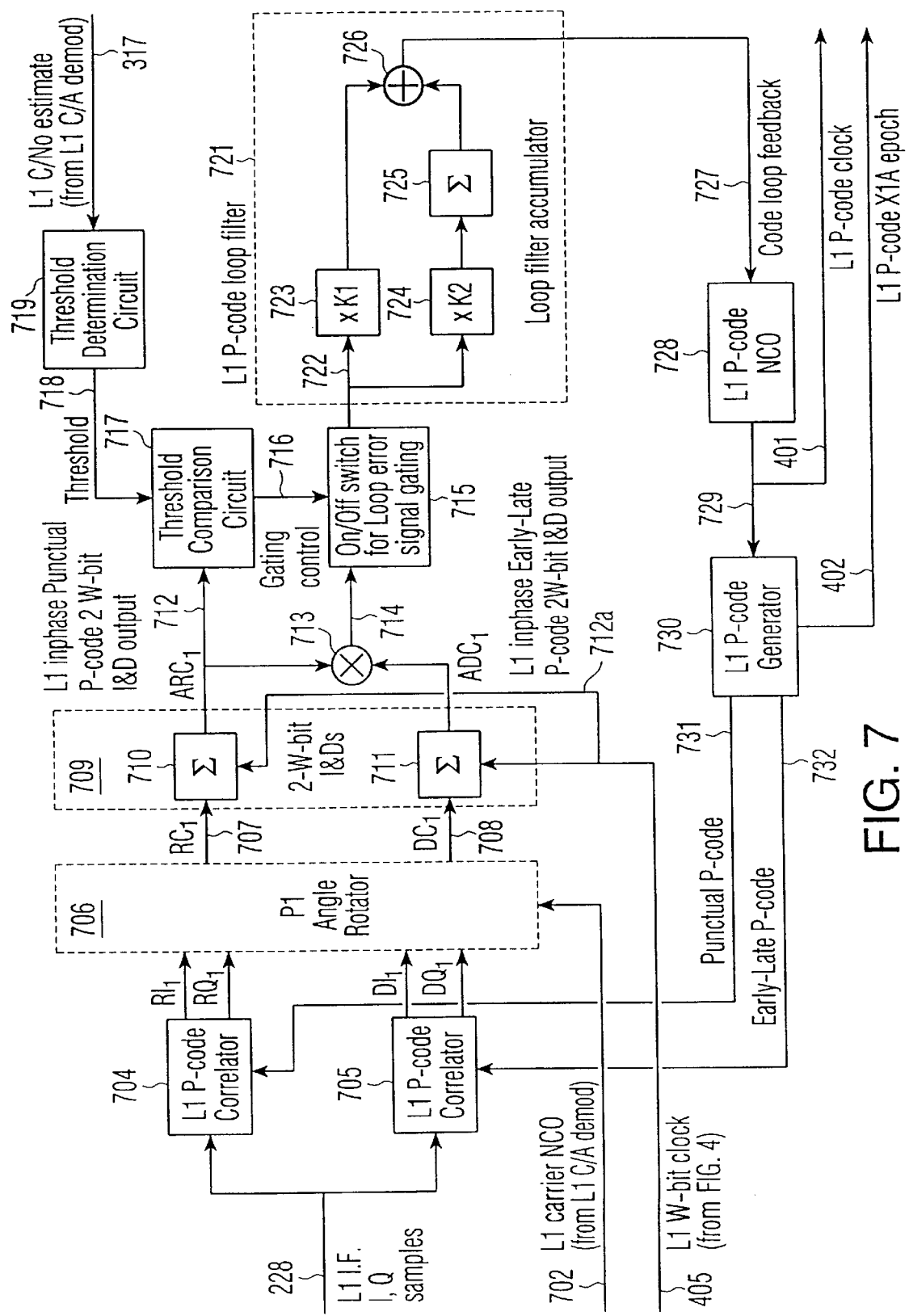
FIG. 7 shows a block diagram of a preferred implementation of an L1 P-code tracking network in accordance with the present invention.

The quadrature (I and Q) samples from the A/D converter 223 are de-multiplexed by an I,Q de-multiplexer 605 that outputs I and Q sample streams in phase quadrature with respect to each other. The I,Q de-multiplexer 605 is controlled by the IF sampling clock 227 generated by the frequency synthesizer 225 as shown in FIG. 2. The I, Q samples are multiplied, by multipliers 606 and 607, with a binary signal 603 having values +/−1. The binary signal 603 is either a punctual version 731, or an early-late version 732, of a local P-code signal, generated by an L1 P-code generator 730, as shown in FIG. 7. A punctual, or an early-late, P-code correlation signal is obtained with the circuit of FIG. 6, depending on whether the binary signal 603 is the punctual version, or the early-late version, of the local P-code signal. The output signals of multipliers 606 and 607 are integrated by I&D filters 608 and 609, respectively, for periods approximately equal to half of a W-bit. This generates the L1 I-sample punctual P-code correlation signal $RI_1$ 610 or L1 I-sample early-late P-code correlation signal $DI_1$ 610, and the L1 Q-sample punctual P-code correlation signal $RQ_1$ 611 or L1Q-sample early-late P-code correlation signal $DQ_1$ 611. Signals 610 and 611 are input to an angle rotator for carrier phase demodulation in FIG. 7. The I&D filters 608 and 609 slow down the required speed of the angle rotator circuit to about 1 MHZ.

Now referring to FIG. 7, there is shown a block diagram of a preferred embodiment of an L1 P-code tracking network of the present invention. As discussed above, the L1 quadrature (I and Q) samples 228 are correlated, at a P-code correlator 704, with the punctual P-code signal 731 generated by the local L1 P-code generator 730. As discussed above, by correlating the I- and Q-samples with the local punctual P-code signals, the L1 I-sample punctual P-code correlation signal ($RI_1$) and the L1 Q-sample punctual P-code correlation signal ($RQ_1$) are obtained at the output of the P-code correlator 704. The $RI_1$ signal is proportional to the L1 punctual P-code correlation function $R_1(\tau)$ weighted by W $\cos\theta_1$, where $\theta_1$ is the angular offset between the received L1 carrier phase and the combined phase of receiver RF and IF local oscillators, and W is the polarity of the W-bit modulation. The polarity of W is unknown to nonmilitary receivers. The $RQ_1$ signal is proportional to the code correlation function $R_1(\tau)$ weighted by W $\sin\theta_1$.

Similarly, the L1 quadrature (I and Q) samples 228 are correlated with the L1 early-late P-code signal 732 generated by the local L1 P-code generator 730 by the P-code correlator 705. An L1 I-sample early-late P-code correlation signal ($DI_1$) and an L1 Q-sample early-late P-code correlation signal ($DQ_1$) are obtained at the output of P-code correlator 705. The $DI_1$ signal is proportional to the L1 early-late P-code correlation function $D_1(\tau)$ weighted by W $\cos\theta_1$, and the $DQ_1$ signal is proportional to the L1 early-late P-code correlation function $D_1(\tau)$ weighted by W $\sin\theta_1$. Since the carrier phase of L1 is tracked in the C/A code demodulator (not shown), the unknown phase in signals $RI_1$, $RQ_1$, $DI_1$, and $DQ_1$ can be removed with the output 702 of the L1 NCO (numerically controlled oscillator) in the Costas loop of an L1 C/A code demodulator. This operation is performed in an angle rotator 706. The output signals $RC_1$ 707 and $DC_1$ 708 of the angle rotator 706 are substantially equal to $WR_1(\tau)$ and $WD_1(\tau)$, respectively, and the L1 unknown phase is removed therefrom.

The signals $RC_1$ and $DC_1$ are integrated over 2 W-bit periods in I&D filters 710 and 711, respectively, at circuit 709. The integrate-and-dump clock control is provided by the L1 W-bit clock signal 405. The I&D filters 710 and 711 output $ARC_1$ 712 and $ADC_1$ 712a, respectively, which are proportional to averaged values of $RC_1$ and $DC_1$ when there is no data polarity change between the two consecutive W-bits during the integrate and dump period. Thus, when there is no data polarity change, a loop error signal 714, obtained by multiplying signals $ARC_1$ 712 and $ADC_1$ 712a at a multiplier 713, will remove the W-bit modulation over a period of two W-bits. Further, the product 714 is proportional to the L1 early-late P-code correlation function $D_1(\tau)$, which is proportional to the code phase error to be tracked and averaged over two W-bit periods. Since the loop error signal 714 is averaged over two consecutive W-bits, its signal-to-noise ratio is 3-dB higher than the same signal generated when averaged over one W-bit only. This results in performance improvement when there is no polarity change between two consecutive W-bits. However, when there is a polarity change, the loop error signal 714 has no signal content, and should be deleted from further code loop processing. This deletion function is performed by an on/off switch 715. The switch 715 is controlled by gating control signal 716, which is generated by comparing the absolute value of signal $ARC_1$ 712 to a threshold 718 at a threshold comparison circuit 717. Similar to the threshold discussed in connection with FIG. 3, the threshold is determined optimally and adaptively by threshold circuit 719, with the estimated C/No 317 of the received L1 signal. The C/No estimate is generated by the C/A code demodulator (not shown) with the aid of the publicly known C/A code. The circuits 715, 717, and 719 are described in more detail in FIG. 8. The loop error signal 714, after being gated by the on/off switch 715, is input to the L1 P-code loop filter 721. Since the W-bit pattern is random in nature, there is 50% probability that there will be no transition between two consecutive W-bits. Thus, the loop will be gated on 50% of the time, and off 50% of the time.

The loop filter shown in FIG. 7 is a second order loop filter. A loop filter output signal 727 is a sum of two terms, obtained by an adder 726. The first term is a proportional term, which is generated by multiplying a gated loop error signal 722 by a constant K1, at circuit 723. The second term is an integrated term, which is generated by integrating the gated loop error signal 722 by an accumulator 725 and then scaling an output of the accumulator 725 by constant K2 at circuit 724. The loop filter output signal 727 is input to the L1 P-code NCO 728, which speeds up or slows down its signal frequency depending on the sign and magnitude of its input signal. An L1 P-code clock signal 729, generated by the NCO 728, is used to control the L1 P-code generator 730, which then tracks the received L1 P-code.

Figure 7A:
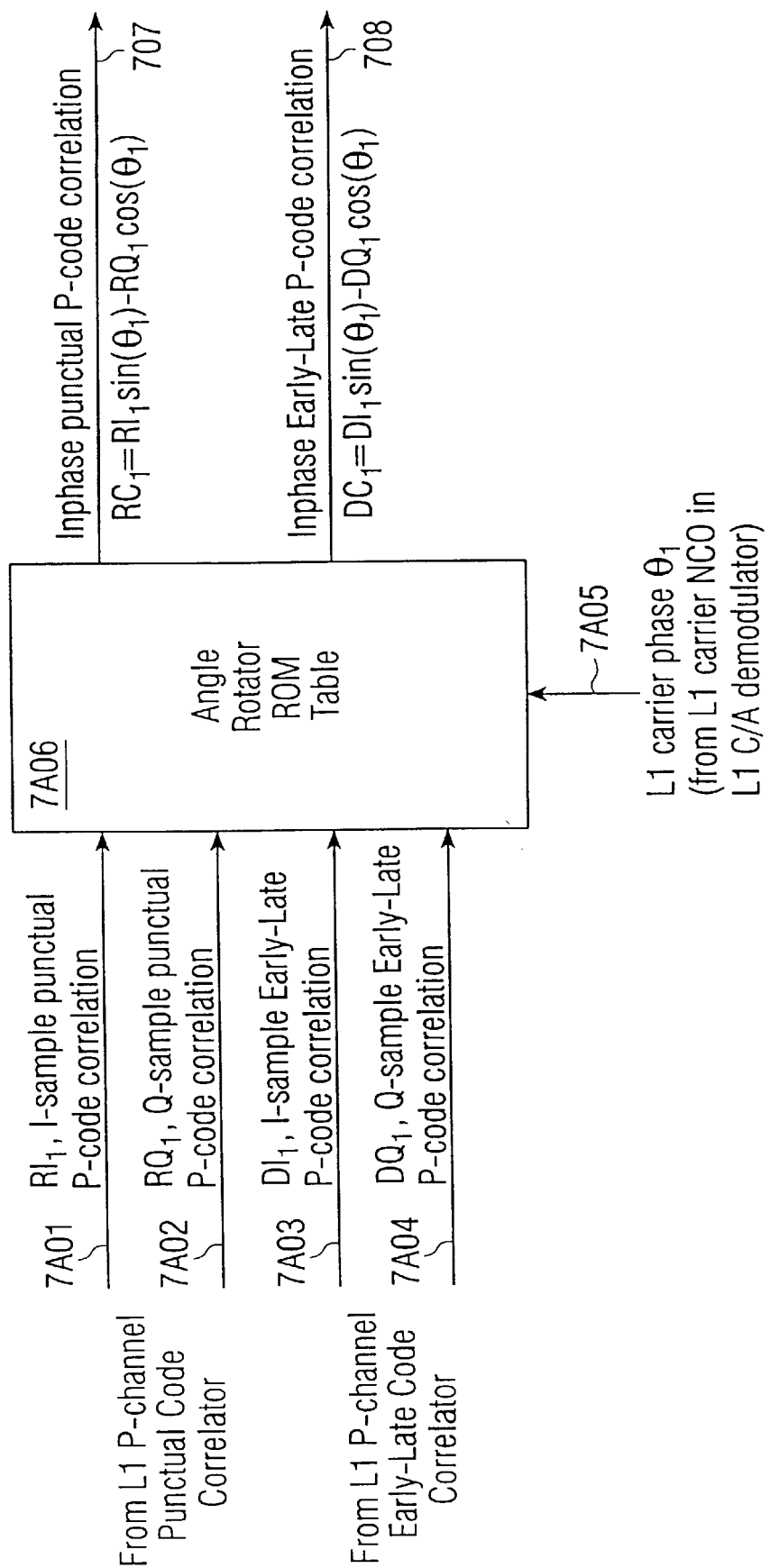
FIG. 7a shows an implementation of the L1 P-code channel angle rotator required in a preferred embodiment.

FIG. 7a shows a preferred embodiment of the L1 P-code channel angle rotator 706 which includes a read-only-memory (ROM) table 7A06. The L1 inphase punctual P-code correlation output $RC_1$ 707 is obtained from the ROM table content by looking up an address specified by the values of $RI_1$ 7A01, $RQ_1$ 7A02, and the value of $\hat{\theta}_1$ 7A05 (also designated as 702 in FIG.), where $\hat{\theta}_1$ is an estimate of $\theta_1$, the L1 carrier phase offset with respect to the receiver RF/IF local oscillators tracked by the C/A code demodulator. The ROM content, $RC_1$, corresponding to this address is equal to $RC_1 = RI_1 \sin(\hat{\theta}_1) - RQ_1 \cos(\hat{\theta}_1)$. The L1 inphase early-late P-code correlation output $DC_1$, 708 is obtained from the ROM table content by looking up an address specified by the values of $DI_1$ 7A03, $DQ_1$ 7A04 and the value of $\theta_1$ 7A05. The ROM content, $DC_1$, corresponding to this address is equal to $DC_1 = DI_1 \sin(\hat{\theta}_1) - DQ_1 \cos(\hat{\theta}_1)$.

Figure 8:
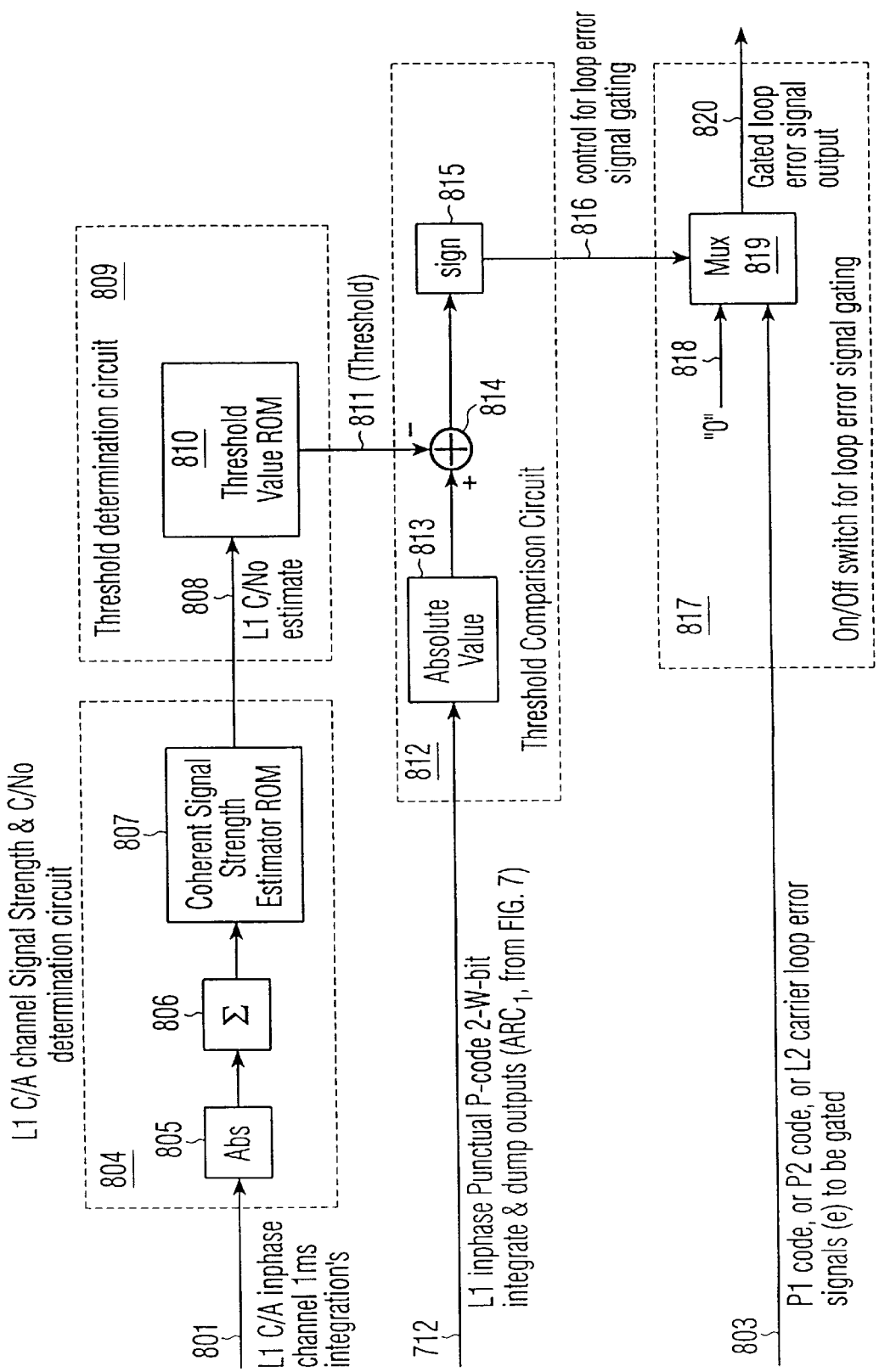
FIG. 8 shows block diagrams of circuits used to i) provide an optimum threshold adaptively according to L1 C/No; ii) perform threshold comparison to determine whether a data polarity change has occurred between the two W-bits in an integrate and dump period; and iii) an on/off switch used for loop error signal gating, in accordance with a preferred embodiment.

FIG. 8 shows detailed block diagrams of: (i) a threshold determination circuit 809 that provides an optimum threshold based on the L1 C/No value (also designated as 719 in FIG. 7); (ii) a threshold comparison circuit 812 that performs threshold comparison to determine whether a data polarity change has occurred between the two W-bits in an integrate and dump period (also designated as 717 in FIG. 7); and (iii) an on/off switch 817 that gates the loop error signal (also designated as 715 in FIG. 7). The L1 C/No estimate signal is obtained in the C/A code demodulator channel of the L1 receiver based on the publicly known C/A code.

Moreover, an exemplary embodiment of the L1 C/No estimator 804 is shown. In this embodiment the absolute values 805 of the L1 C/A inphase channel 1-ms integration 801 are accumulated over a sufficiently long time interval in accumulator 806 to provide a reliable estimate of the L1 C/A signal envelope. This envelope value is related to the received C/No in a one-to-one relationship and can be put into a table format. The table is stored into a ROM lookup table 807. Subsequently, the estimated C/No is obtained based on the estimate of the L1 C/A signal envelope from the ROM table lookup 807.

Furthermore, the estimated C/No value is related to the best optimum threshold value in a one-to-one relationship and can be put into a table format. This table is stored into a threshold value ROM 810. In other words, the ROM 810 stores optimum threshold values for the expected range of estimated C/No values, in 1-dB steps. Therefore, a specific optimum threshold value is looked up from the ROM 810 using the estimated C/No value.

Figure 8A:
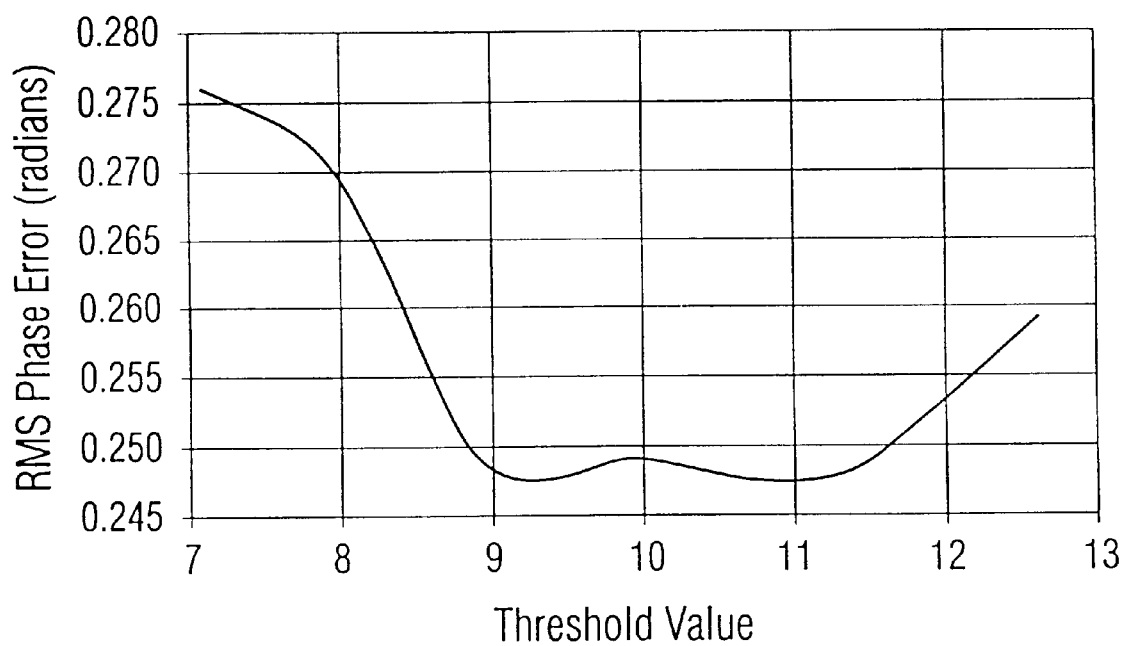
FIG. 8A depicts a plot of exemplary optimal threshold values.

The optimum threshold values are in the range between 9 to 11 for the L1 P-code signal C/No of 36 dB-Hz. When the threshold is much larger than 12, loop performance degrades due to frequent false detections of polarity changes and loss of valid signal samples. When the threshold is smaller than 9, RMS error in the L2 tracking loop increases rapidly, as it increasingly fails to detect polarity changes. This results in allowing noise-only samples to be processed by the tracking loop. Therefore, the optimum threshold range for the expected range of estimated C/No values, e.g., 33 to 43 dB-Hz, are determined. In particular, the optimum threshold value is the threshold value that provides the lowest RMS phase error in the L2 carrier tracking loop. In this process a table/plot is generated that provides the optimum threshold for each L1 P-code signal C/No value in, e.g., 1 dB steps, similar to an exemplary plot depicted in FIG. 8A for each range of values of L1 P-code signal C/No.

The above described threshold table generation approach can also be used in the threshold determination circuits 318 and 719 of FIGS. 3 and 7. This ROM table can also be implemented inside the navigation and control processor 118 of FIG. 1.

Referring back to FIG. 8, the optimal threshold value is input to the threshold comparison circuit 812. Further, in the threshold comparison circuit 812, the absolute value of $ARC_1$ is obtained at circuit 813 and from that value is subtracted the value of the optimal threshold 811 at the adder 814. The sign of the difference obtained by a circuit 815 controls the on/off switch 817. The switch is "on" if the sign 816 is positive and is "off" if the sign 816 is negative. The on/off switch 817 is implemented with a mux circuit 819, which outputs the loop error signal 803 only when the control signal 816 is positive and outputs the zero value "0" to the on/off switch 817 when the control signal 816 is negative. Substantially identical on/off switches to the on/off switch 817 are utilized for the P1 code loop, the P2 code loop, and the L2 carrier loop. As indicated in FIG. 8, the input to the on/off switch 817 can be the P1 code loop error signal, or the P2 code loop error signal, or the L2 carrier loop error signal, depending where the switch 817 is used. All control loops require gating (and the on/off switch) as discussed in connection with FIGS. 7, 10, 11, and 12.

Figure 9:
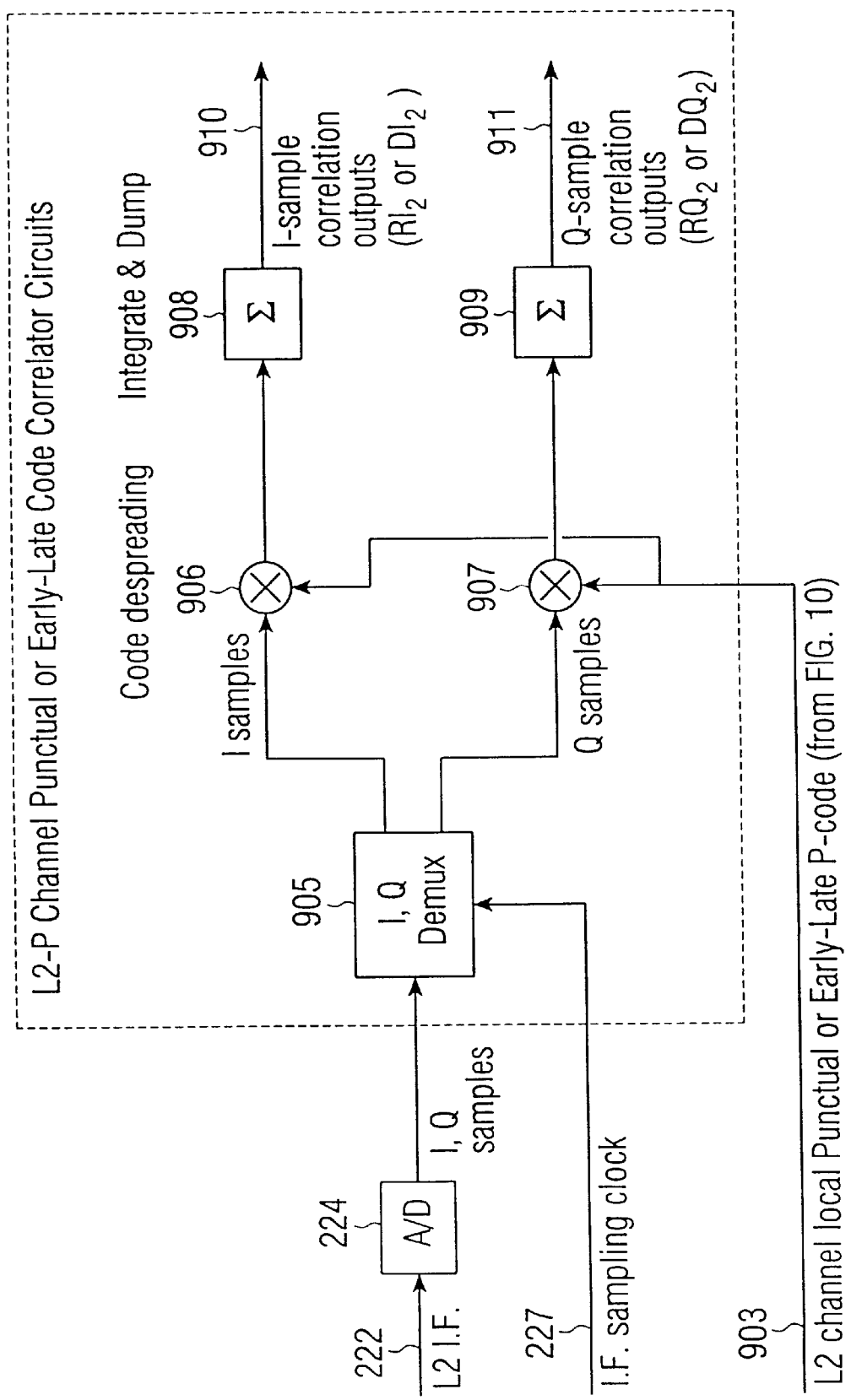
FIG. 9 shows a block diagram of a preferred embodiment of the punctual and early-late L2 P-code correlator.
Figure 10:
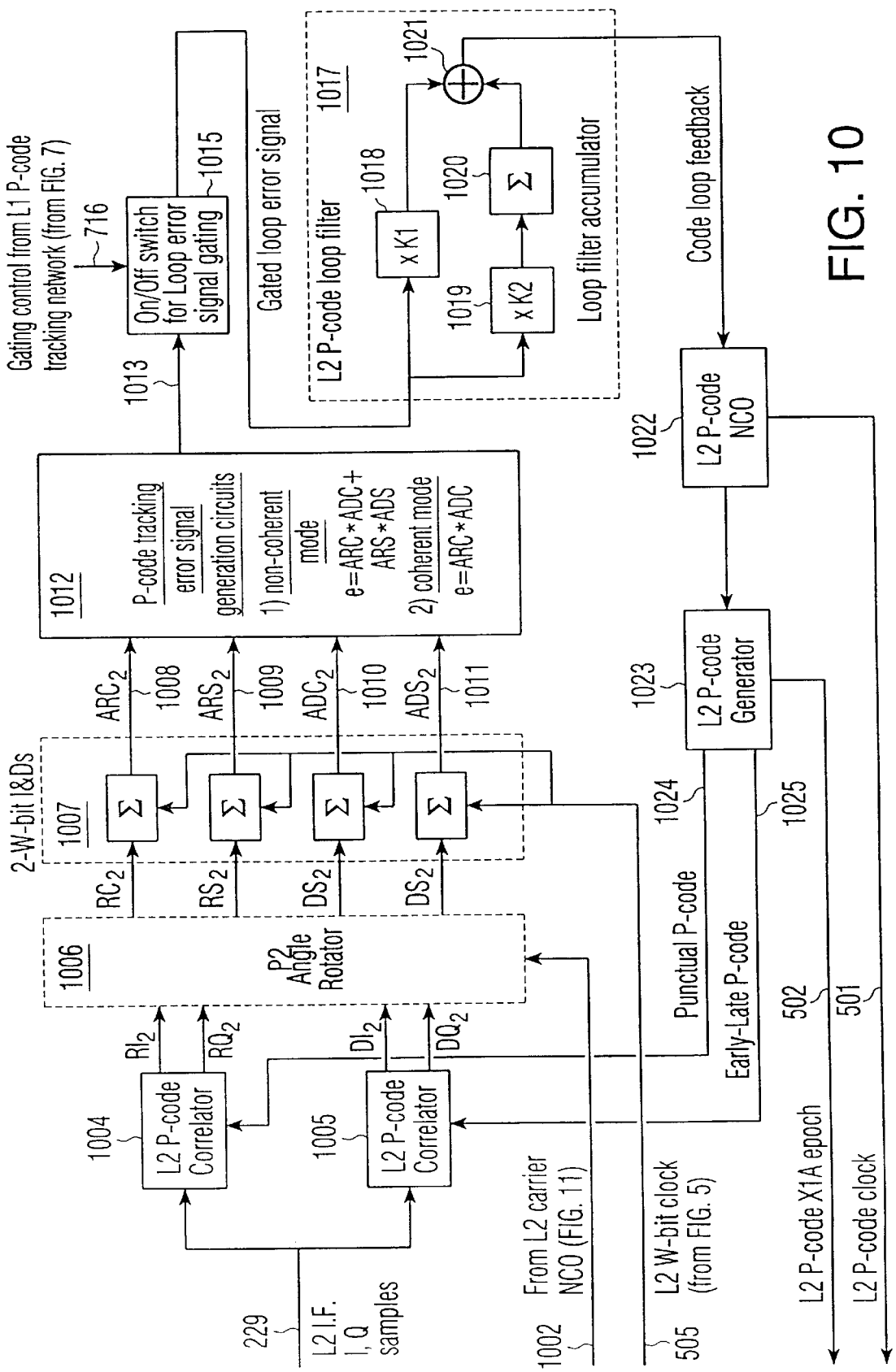
FIG. 10 shows a block diagram of a preferred embodiment of an L2 P-code tracking network in accordance with the cross-correlation technique of the present invention.

FIG. 9 shows a block diagram of a preferred embodiment of the L2 punctual and early-late P code correlators. The embodiment shown in FIG. 9 represents a digital embodiment of the analog functions 328, 329, 331, and 332 of FIG. 3. As discussed above in connection with FIG. 2, the L2 second IF signal 222 is sampled by the A/D converter 224. The quadrature (I and Q) samples from the A/D converter 224 is de-multiplexed by an I,Q de-multiplexer 905 into I and Q sample streams that are in phase quadrature with respect to each other. The I,Q de-multiplexer 905 is controlled by the IF sampling clock 227 generated by the frequency synthesizer 225 as shown in FIG. 2. The I, Q samples are multiplied, by multipliers 906 and 907, with a binary signal 903 with values +/−1. The binary signal 903 is either a punctual version 1024, or an early-late version 1025, of a local P-code, generated by an L1 P-code generator 1023, as shown in FIG. 10. A punctual, or an early-late, P-code correlation signal is obtained with the circuit of FIG. 9, depending on whether the binary signal 903 is the punctual version, or the early-late version, of the local P-code signal. The output signals of multipliers 906 and 907 are integrated by I&D filters 908 and 909, respectively, for periods approximately equal to half of a W-bit. This results in an L2 I-sample punctual P-code correlation signal $RI_2$ 910 or L2 I-sample early-late P-code correlation signal $DI_2$ 910; and an L2 Q-sample punctual P-code correlation signal $RQ_2$ 911 or L2 Q-sample early-late P-code correlation signal $DQ_2$ 911. The signals 910 and 911 are input to an angle rotator for carrier phase demodulation in FIG. 10. Similar to the L1 P-code correlator circuit of FIG. 6, the I&D filters 908 and 909 slow down the required speed of the angle rotator circuit to about 1 MHZ, so that its implementation is not difficult.

Now referring to FIG. 10, there is shown a block diagram of a preferred embodiment of an L2 P-code tracking network of the present invention that includes the non-coherent and the coherent modes.

The L2 IF quadrature (I and Q) samples 229 are correlated, at a P-code correlator 1004, with the punctual P-code signal 1024 generated by the local L2 P-code generator 1023. As discussed above, by correlating the I- and Q-samples with the local punctual P-code, an L2 I-sample punctual P-code correlation signal $RI_2$ and an L2 Q-sample punctual P-code correlation signal $RQ_2$ are generated by the P-code correlator 1004. The $RI_2$ signal is proportional to the L2 punctual P-code correlation function $R_2(\tau)$ weighted by $W \cos\theta_2$, where $\theta_2$ is the angular offset between the received L2 carrier phase and the combined phase of receiver RF and IF local oscillators, and W is the polarity of the W-bit modulation. The polarity of W is unknown to the nonmilitary receivers. The $RQ_2$ signal is proportional to the code correlation function $R_2(\tau)$ weighted by $W \sin\theta_2$.

Similarly, the L2 quadrature (I and Q) samples 1001 are correlated with the L2 early-late P-code signal 1025 generated by the local L2 P-code generator 1023 at P-code correlator 1005. A L2 I-sample early-late P-code correlation signal $DI_2$ and an L2 Q-sample early-late P-code correlation signal $DQ_2$ are obtained at the output of 1005. The $DI_2$ signal is proportional to the L2 early-late P-code correlation function $D_2(\tau)$ weighted by $W \cos\theta_2$, and the $DQ_2$ signal is proportional to the L2 early-late P-code correlation function $D_2(\tau)$ weighted by $W \sin\theta_2$. When the L2 carrier tracking is established, the phase offset between the received L2 phase and that of the RF/IF local oscillators will be tracked by the L2 carrier NCO (shown in FIG. 11) 1120. Thus, the unknown phase in signals $RI_2$, $RQ_2$, $DI_2$, and $DQ_2$ can be removed with the output 1002 of the L2 NCO after the L2 carrier is recovered. This operation is performed by the angle rotator 1006. However, prior to L2 carrier lock, the L2 carrier NCO phase will not be the same as $\theta_2$, the phase difference between the received L2 and the phase of the receiver RF/IF local oscillators. Further, there will be a phase offset, $\theta_2$, between the received signal and that of the receiver phase reference at the output of the angle rotator. Therefore, the P2 code loop operates in the non-coherent mode before L2 carrier lock is detected and, then, transitions to the coherent mode when L2 carrier lock is detected.

The output signals $RC_2$, $RS_2$, $DC_2$, and $DS_2$ of the angle rotator 1006 are equal to $R_2(\tau) \times \cos\theta_2$, $WR_2(\tau) \times \sin\theta_2$, $WR_2(\tau) \times \cos\theta_2$, and $WD_2(\tau) \times \cos\theta_2$, respectively. $\theta_2$ becomes approximately zero when L2 carrier lock is established and can be any arbitrary angle prior to L2 carrier lock. The signals $RC_2$, $RS_2$, $DC_2$, and $DS_2$ are integrated over each pair of W-bits by four I&D filters in circuit 1007. The integrate-and-dump clock is controlled by the L2 W-bit clock signal 505. The two W-bit period I&D outputs $ARC_2$ 1008, $ARS_2$ 1009, $ADC_2$ 1010, and $ADS_2$ 1011 are proportional to the averaged values of $RC_2$, $RS_2$, $DC_2$, and $DS_2$, respectively, when there is no data polarity change between the two consecutive W-bits in the integrate and dump period.

In the non-coherent mode P2 code loop a loop error signal 1013 is computed in circuit 1012 as:

$$e = ARC_2 \times ADC_2 + ARS_2 \times ADS_2 \quad \text{(non-coherent mode)}$$

And in the coherent mode P2 code loop, the loop error signal 1013 is computed in circuit 1012 as $$e = ARC_2 \times ADC_2 \quad \text{(coherent mode)}$$

In the coherent mode there is no $\theta_2$ dependence because $\theta_2$ is approximately zero. In the non-coherent mode, the $\theta_2$ dependence is avoided by forming the product signal $e = ARC_2 \times ADC_2 + ARS_2 \times ADS_2$, which is proportional to $R_2(\tau) \times D_2(\tau)$. Thus, when there is no data polarity change, the error signals, for both the coherent and non-coherent modes, will remove the W-bit modulation over a period of two W-bits. The error signals are proportional to the L2 early-late P-code correlation function $D_2(\tau)$, which is proportional to the code phase error to be tracked, averaged over two W-bit periods. Circuit 1012 can be implemented with multipliers and adders, or it can be implemented with software in a digital signal processor.

Since the loop error signal 1013 is averaged over two consecutive W-bits, its signal-to-noise ratio is 3-dB higher than the same signal generated when averaged over one W-bit only. The loop error signal 1013 provides performance improvements when there is no polarity change between two consecutive W-bits. However, when there is a polarity change, the loop error signal 1013 will have no signal content and should be deleted from further code loop processing. An on/off switch 1015 performs the deletion function. The switch 1015 is controlled by the gate control signal 716. The threshold is determined optimally and adaptively, as described above in connection with FIG. 7. The on/off switch 1015 is implemented in the substantially identical manner as described in 817 of FIG. 8. The loop error signal 1013, after being gated by the on/off switch 1015, is input to the L2 P-code loop filter 1017. Since the W-bit pattern is random in nature, there is 50% probability that there will be no transition between two consecutive W-bits. Thus, on an average, the P2 code loop will be gated on 50% of the time, and off 50% of the time, similar to the P1 code loop. The loop filter shown in FIG. 10 is a second order loop filter. Its output includes two terms: a proportional term, which is generated by multiplying a gated loop error signal 1016 with a constant K1 at circuit 1018, and an integrated term, which is generated by integrating the gated loop error signal 1016 by an accumulator 1020 and scaled by constant K2 at circuit 1019. The loop filter output signal is the sum of these two terms obtained at the output of an adder 1021. The loop filter output is input to the L2 P-code NCO 1022, which speeds up or slows down its internal signal frequency depending on the sign and magnitude of its input signal. An L2 P-code clock signal, generated by the NCO 1022, controls the L2 P-code generator 1023, which then tracks the received L2 P-code.

Figure 10A:
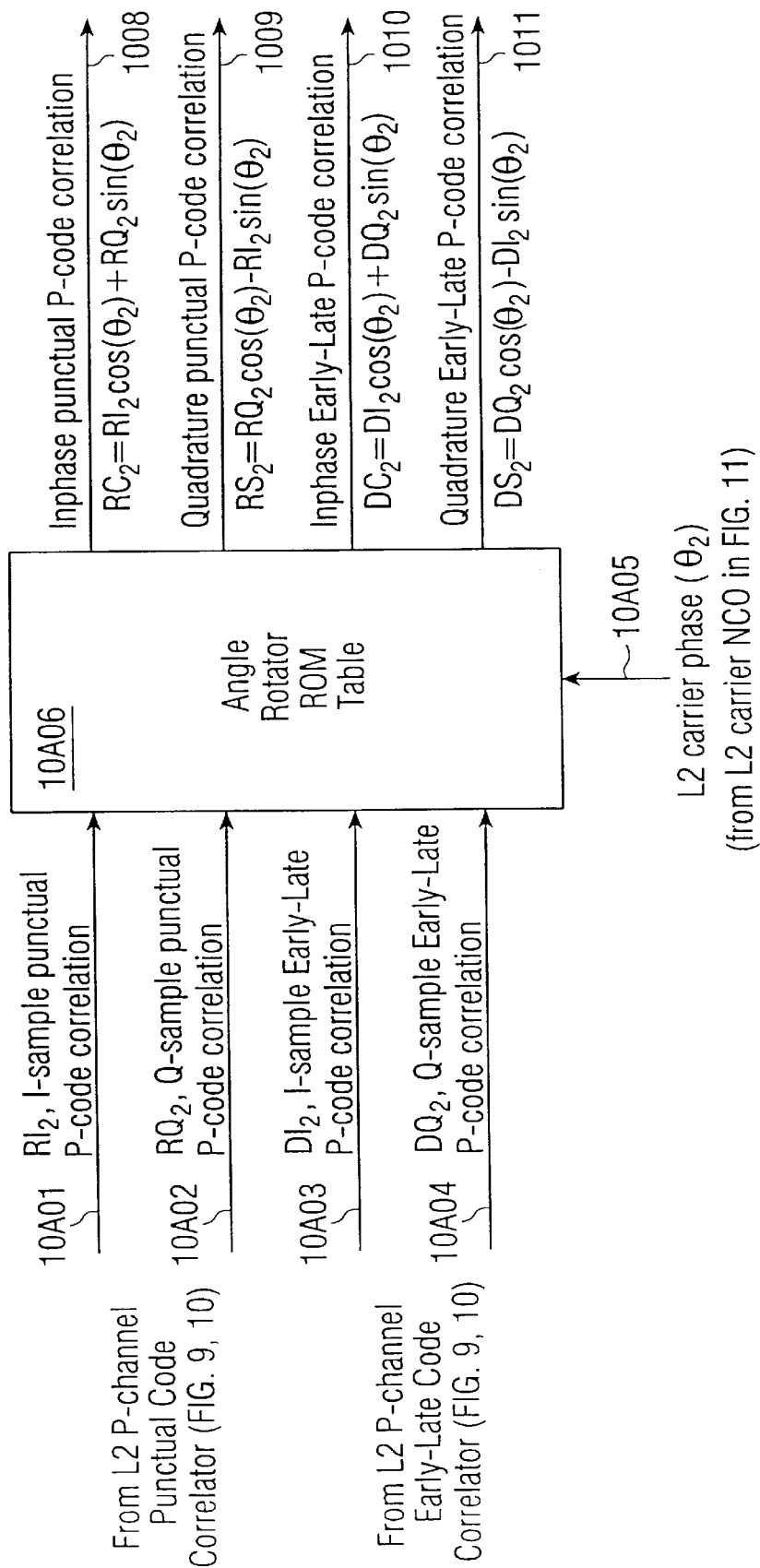
FIG. 10a shows an implementation of the L2 P-code channel angle rotator required in a preferred embodiment.

FIG. 10a shows a preferred embodiment of the L2 P-code channel angle rotator 1006 which includes a read-only-memory (ROM) table 10A06. The L2 inphase and quadrature punctual P-code correlation output signals $RC_2$, 10A07 and $RS_2$ 10A08 are obtained from the ROM table content by looking up two separate tables with their addresses specified by the values of $RI_2$ 1008, $RQ_2$ 1009, and the value of $\hat{\theta}_2$ 10A05, where $\hat{\theta}_2$ is an estimate of the L2 carrier phase offset with respect to the receiver RF/IF local oscillators, tracked by the L2 carrier loop described in FIGS. 11 and 12. The ROM table 10A06 content, RC2 and RS2, corresponding to this address is specified by the relationships $RC_2 = RI_2 \cos(\hat{\theta}_2) - RQ_2 \sin(\hat{\theta}_2)$ and $RS_2 = RQ_2 \cos(\hat{\theta}_2) - RI_2 \sin(\hat{\theta}_2)$. The L1 inphase and quadrature early-late P-code correlation outputs $DC_2$ 1010 and $DS_2$ 1011 are obtained from the ROM table content by looking up two separate tables with their address specified by the values of $DI_2$ 10A03, $DQ_2$ 10A04, and the value of $\hat{\theta}_2$ 10A05. The ROM content, $DC_2$ and $DS_2$, corresponding to this address is specified by the relationships $DC_2 = DI_2 \cos(\hat{\theta}_2) - DQ_2 \sin(\hat{\theta}_2)$ and $DS_2 = DQ_2 \cos(\hat{\theta}_2) - DI_2 \sin(\hat{\theta}_2)$.

Figure 11:
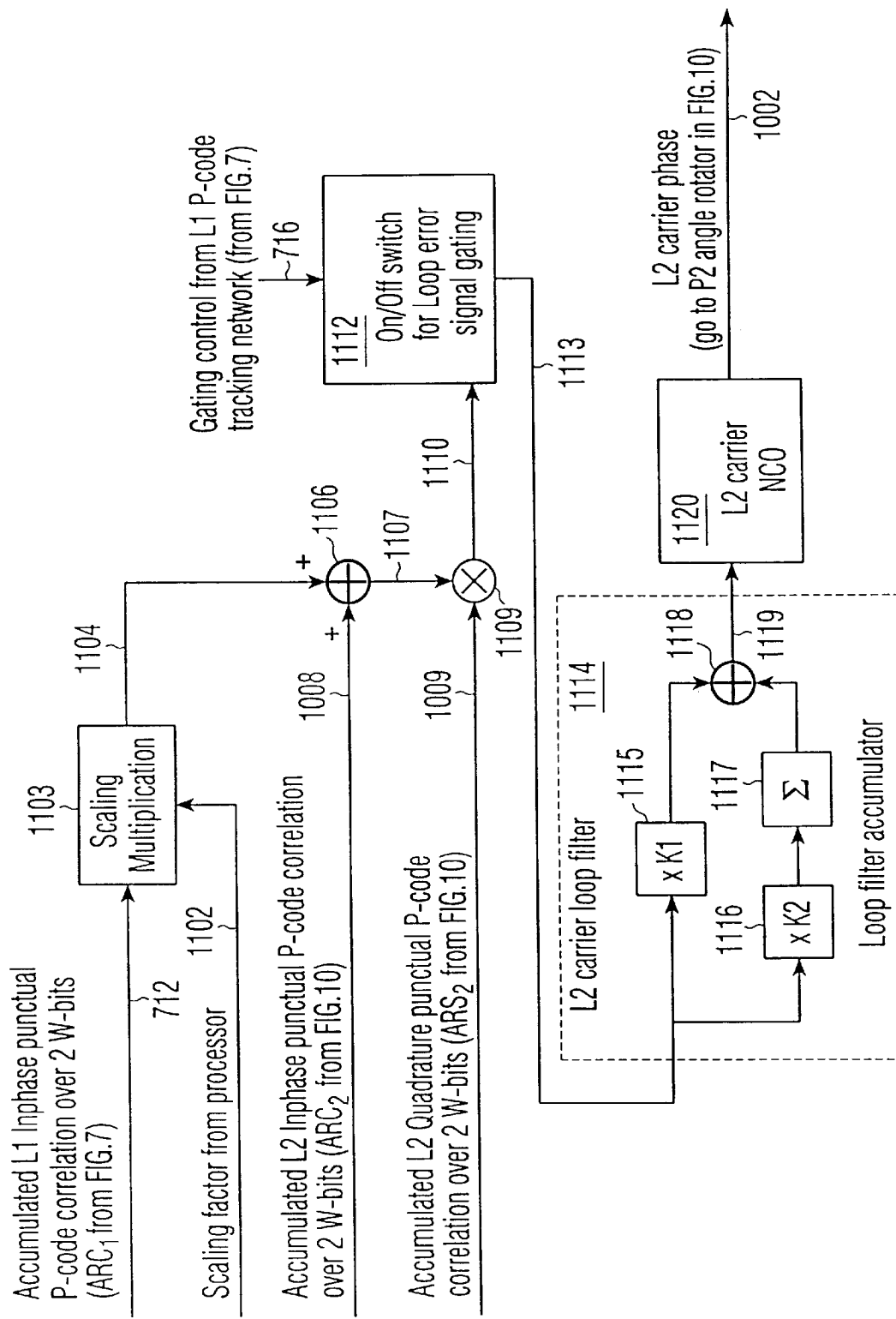
FIG. 11 shows a block diagram of an L2 carrier tracking loop network implemented in accordance with the cross-correlation technique of the present invention.

FIG. 11 shows a block diagram of a preferred embodiment of an L2 carrier tracking loop network. The accumulated value $ARC_1$ is multiplied by a scaling constant 1102 at a multiplier 1103. The scaling constant 1102 is controlled and input from the control processor 118 of FIG. 1. The value of this constant is preferably commensurate with the difference (3 dB) between the received L1 and L2 P-code signal powers, and is preferably set to the value $\sqrt{2}$. An output of the multiplier 1103, i.e., $ARC_1$ scaled by $\sqrt{2}$, or any other constant as controlled by the processor, is added by an adder 1106 to the accumulated value $ARC_2$ 1008.

As described previously, when there is no data polarity change between the two adjacent W-bits in the integration period, the signal $ARC_1$ is proportional to $WR_1(\tau) \cos\phi_1$, where W is the polarity of the two adjacent W-bits, $R_1(\tau)$ is the auto-correlation function of the L1 P-code signal with the local version of the punctual P-code, and $\phi_1$ is the angular error in tracking L1. $\phi_1$ is close to zero after L1 carrier phase recovery in the C/A code demodulator. Further, since the P1 code is in code lock prior to the receiver's commencing of L2 tracking, the time error between the local P1 code and the received P1 code is close to zero, and $R_1(\tau)$ is near its peak value $R_1(0)$. Thus $ARC_1$ is basically equal to $W R_1(0)$.

Similarly, the signal $ARC_2$ is proportional to $WR_2(\tau) \times \cos\phi_2$, where W is the polarity of the two adjacent W-bits, where $R_2(\tau)$ is the auto-correlation function of the L2 P-code signal with the local version of the punctual P-code, and $\phi_2$ is the angular error in tracking the received L2 carrier. Further, the P2 code is already acquired and tracked (in the non-coherent mode) before the receiver starts to acquire and track the L2 carrier. Thus, $ARC_2$ is substantially equal to $W R_2(0) \cos\phi_2$.

An output signal 1107 of the adder 1106 is then equal to $\sqrt{2}WR_1(0)+WR_2(0)\cos\phi_2$ when there is no data polarity change between the two W-bits in the integrate and dump period of $ARC_1$ and $ARC_2$. This signal 1107 is multiplied with the accumulated value $ARS_2$ 1009 of the L2 quadrature punctual P-code correlation. As described previously, the signal $ARS_2$ is proportional to $WR_2(\tau)\times\sin\phi_2$, and $\phi_2$ is close to zero after non-coherent P2 code track is established.

The signals 1107 and 1009 are multiplied at a multiplier circuit 1109. An output signal 1110 of the multiplier 1009 is then proportional to $R_1(0)R_2(0)[\sqrt{2}\sin\phi_2+(1/\sqrt{2})\sin\phi_2]$ when there is no data polarity change between the two W-bits in the integrate and dump period. This output signal 1110 is a valid measure of L2 carrier phase error and allows full wavelength L2 carrier phase recovery without half cycle ambiguities.

When there is a data polarity change between the two W-bits during the integrate and dump period, there is no valid signal component in the output signal 1110. Thus, the output signal 1110 should be deleted from the input to an L2 carrier loop filter 1114. An on/off switch 1112 performs this deletion function, which is implemented as shown in circuit 817 of FIG. 8. The on/off switch 1112 is controlled by the gating control signal 1111, which is labeled as 716 in FIG. 7.

An output signal 1113 of the switch 1112 is input to the L2 carrier loop filter 1114, which is a second order loop filter. An output 1119 of the loop filter 1114 includes two terms: a proportional term, which is generated by multiplying the gated loop error signal 1113 at circuit 1115 by a constant K1, and an integrated term, which is generated by integrating the gated loop error signal 1113 by an accumulator 1117, scaled by constant K2 at circuit 1116. The loop filter output 1119 is the sum of these two terms obtained at the output of the adder 1117. The loop filter output 1119 is input to an L2 carrier NCO 1120, which speeds up or slows down its internal signal frequency depending on the sign and magnitude of its input signal. The estimated L2 carrier phase 1002 generated by the NCO 1120 is input to the L2 P-code channel angle rotator 1006 in FIG. 10 to track the received L2 carrier phase.

Figure 12:
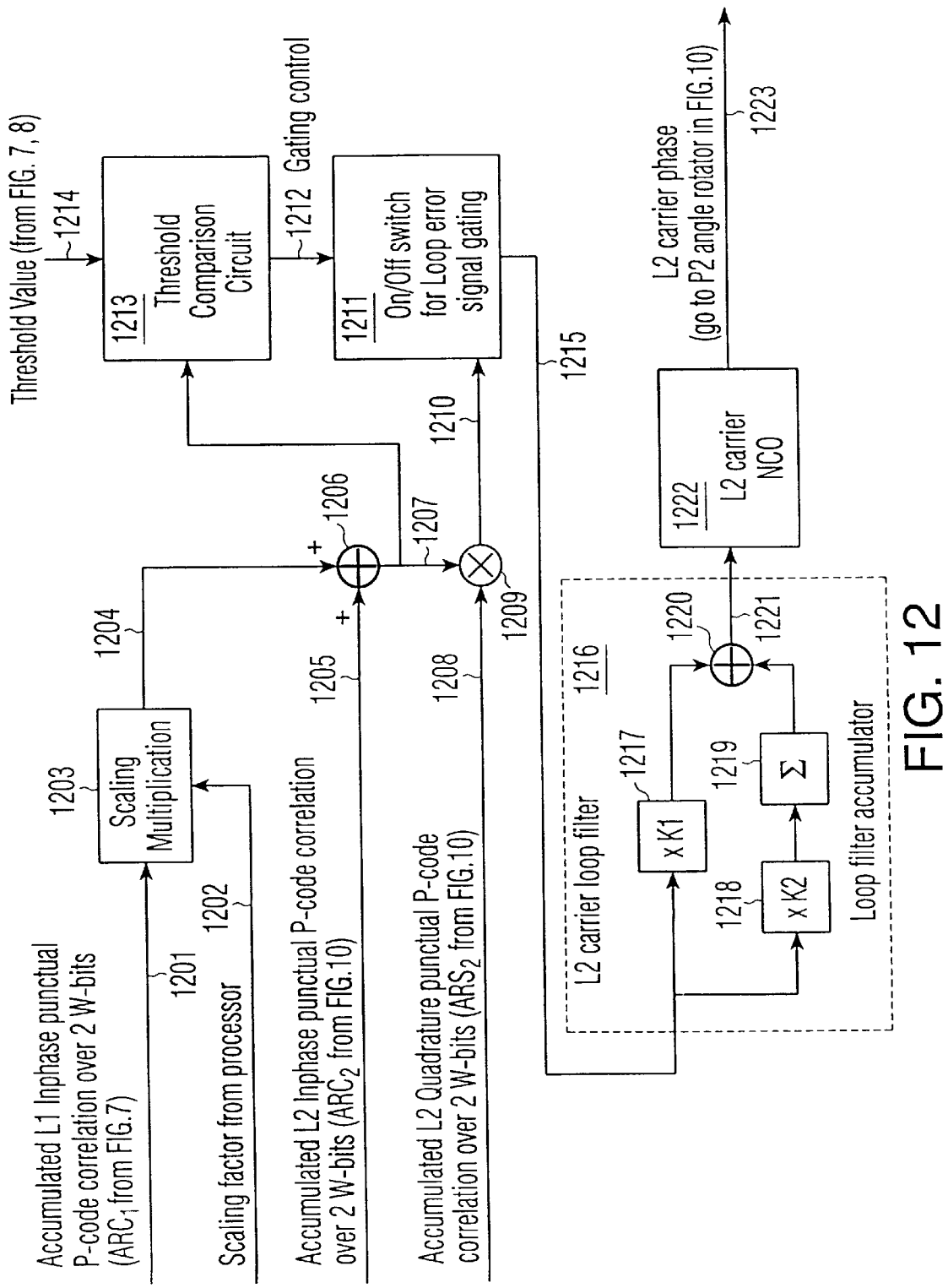
FIG. 12 shows a block diagram of an alternative embodiment of the L2 carrier tracking loop network implemented in accordance with the cross-correlation technique of the present invention.

FIG. 12 shows a block diagram of an alternative embodiment of the L2 carrier tracking loop network. The difference between FIGS. 11 and 12 is in the generation of the control signal for their respective on/off switches 1211, 1112. In FIG. 11 the control of the on/off switch 1112 is determined by comparing the absolute value of $ARC_1$ to an optimum threshold. In FIG. 12 the absolute value of signal 1207, which is the sum of $ARC_1$ scaled by $\sqrt{2}$, i.e., the signal 1204, and the signal $ARC_2$ 1205, is compared with the optimum threshold 1214 in a threshold comparison circuit 1213. The output 1212 of the threshold comparison circuit is used to gate the loop error signal 1210. Other circuits in FIG. 12 are implemented in the substantially identical manner as described in FIG. 11. FIG. 12 the energy of both $ARC_1$, which is derived from the GPS L1 signal, and $ARC_2$, which is derived from the GPS L2 signal, are combined to compare with a selected threshold to determine whether there is polarity change. This embodiment provides an improvement over the embodiment described in FIG. 11 in its SNR performance.

Although the preferred embodiments of the invention have been described in the foregoing description, it will be understood that the present invention is not limited thereto only. It should be understood that the materials used and the mechanical detail maybe slightly different or modified from the description herein without departing from the methods and composition disclosed and taught by the present invention as recited in the claims.

What is claimed is:

1. A global positioning satellite (GPS) demodulator configured to receive a GPS signal which includes modulated C/A code, L1 P-code, L2 P-code and encrypting W-code signals, the demodulator comprising:

an L1 P-code generator configured to generate first and second L1 P-code signals that are local replica signals of the L1 P-code of the GPS signal;

a first demodulator configured to demodulate the GPS signal based on, in part, the first and second L1 P-code signals, to thereby generate first and second demodulated L1 P-code signals;

a first pair of integrate-and-dump (I&D) filters configured to generate a first integrated L1 P-code signal by integrating the first demodulated L1 P-code signal and configured to generate a second integrated L1 P-code signal by integrating the second demodulated L1 P-code signal during a predetermined integration period;

a first thresholding module configured to generate a first switch control signal by comparing the first integrated L1 P-code signal to a first predetermined threshold value to determine whether the encrypting W-code changed polarity during the predetermined integration period; and a first switch configured to output a first adjusting signal based on a signal derived from the first and second integrated L1 P-code signals and based on the first switch control signal, wherein the L1 P-code generator is further configured to be adjusted based on a signal derived from the first adjusting signal, to thereby accurately generate the first L1 P-code signal which tracks the L1 P-code of the GPS signal.

2. The demodulator according to claim 1 wherein the integration period is substantially equal to that of two bit periods of the encrypting W-code.

3. The demodulator according to claim 1 wherein the first switch is further configured to output a null signal as the first adjusting signal when the encrypting W-code changed polarity during the integration period.

4. The demodulator according to claim 1 further comprising a threshold determination module configured to generate the first threshold value based on an estimated carrier-to-noise (C/No) ratio value of the L1 P-code of the GPS signal.

5. The demodulator according to claim 4 further comprising a C/No ratio estimator configured to generate the estimated C/No ratio value based on a signal strength value of the C/A code of the GPS signal.

6. The demodulator according to claim 4 wherein the threshold determination module comprises a look-up-table including a plurality of entries, each entry setting forth a respective threshold value for a respective predetermined range of C/No ratio values.

7. The demodulator according to claim 6 wherein the predetermined range of the C/No ratio values for at least a plurality of the entries in the look-up-table is a 1 dB interval.

8. The demodulator according to claim 1 further including:

an L2 P-code generator configured to generate first and second L2 P-code signals that are local replica signals of the L2 P-code of the GPS signal;

a second demodulator configured to demodulate the GPS signal based on, in part, the first and second L2 P-code signals, to thereby generate first and second demodulated L2 P-code signals; and a second pair of I&D filters configured to generate a first integrated L2 P-code signal by integrating the first demodulated L2 P-code and configured to generate a second integrated L2 P-code signal by integrating the second demodulated L2 P-code signal during the predetermined integration period; and a second switch configured to output a second adjusting signal based on a signal derived from the first and second integrated L2 P-code signals and based on the first switch control signal, wherein the L2 P-code generator is further configured to be adjusted based on a signal derived from the second adjusting signal, to thereby accurately generate the first L2 P-code signal which tracks the L2 P-code of the GPS signal.

9. The demodulator according to claim 8 wherein the second switch is further configured to output a null signal as the second adjusting signal when the encrypting W-code changed its polarity during the predetermined integration period.

10. The demodulator according to claim 8 further comprising:

a third pair of I&D filters configured to generate a third integrated L2 P-code signal by integrating a demodulated third L2 P-code and configured to generate a fourth integrated L2 P-code signal by integrating a fourth demodulated L2 P-code signal during the predetermined integration period, wherein the second demodulator is further configured to generate the third and fourth demodulated L2 P-code signals by demodulating the GPS signal based on, in part, the first and second L2 P-code signals.

11. The demodulator according to claim 10 further comprising:

a controller configured to determine whether a local L2 carrier signal is locked on to the L2 carrier of the GPS signal, wherein the second switch is further configured to output a signal derived from the first, second, third and fourth integrated L2 P-code signals as the second adjusting signal when the encrypting W-code changed its polarity during the integration period and when the predetermined local L2 carrier signal has not locked on to the L2 carrier of the GPS signal.

12. The demodulator according to claim 8 further comprising:

an L2 carrier oscillator configured to generate a local L2 carrier signal that is a local replica signal of a L2 carrier of the GPS signal, wherein the second demodulator is further configured to demodulate the GPS signal based on, in part, the local L2 carrier signal in addition to the first and second L2 P-code signals, to thereby generate fifth and sixes demodulated L2 P-code signals;

a fourth pair of I&D filters configured to generate a fifth integrated L2 P-code signal by integrating the fifth demodulated L2 P-code and configured to generate a sixth integrated L2 P-code signal by integrating the sixth demodulated L2 P-code signal during the predetermined integration period; and a third switch configured to output a third adjusting signal based on a signal derived from the fifth and sixth integrated L2 P-code signals and the first integrated L1 P-code signal and based on the first switch control signal, wherein the L2 carrier oscillator is further configured to be adjusted based on a signal derived from the third adjusting signal, to thereby accurately generate the local L2 carrier signal which tracks the L2 carrier of the GPS signal.

13. The demodulator according to claim 12 wherein the third switch is further configured to output a null signal as the third adjusting signal when the encrypting W-code changed its polarity during the predetermined integration period.

14. The demodulator according to claim 12 further comprising:

a second thresholding module configured to generate a second switch control signal by comparing a signal derived from the first integrated L1 P-code signal and the fifth integrated L2 P-code signal to a second predetermined threshold value to determine whether the encrypting W-code has changed its polarity during the integration period; and a fourth switch configured to output a fourth adjusting signal based on a signal derived from the first integrated L1 P-code signal, the fifth and sixth integrated L2 P-code signals and based on the second switch control signal, wherein the L2 carrier oscillator is further configured to be adjusted based on a signal derived from the fourth adjusting signal, to thereby accurately generate the local L2 carrier signal which tracks the L2 carrier of the GPS signal.

15. The demodulator according to claim 14 wherein the fourth switch is further configured to output a null signal as the fourth adjusting signal when the second thresholding module determines that the encrypting W-code changed its polarity during the predetermined integration period.

16. A method of processing a global positioning system (GPS) signal which includes modulated C/A code, L1 P-code, L2 P-code and encrypting W-code signals, comprising the steps of:

demodulating the GPS signal based on, in part, first and second L1 P-code signals that are locally generated replica signals of the L1 P-code of the GPS signal, to thereby generate first and second demodulated L1 P-code signals;

separately integrating the first and second demodulated L1 P-code signals over a predetermined integration period, to thereby generate first and second integrated L1 P-code signals;

comparing the first integrated L1 P-code signal to a first predetermined threshold value to determine whether the encrypting W-code has changed its polarity during the predetermined integration period; and adjusting the first L1 P-code signal based on the first and second integrated L1 signals and based on whether the encrypting W-code changed polarity during the integration period, to thereby accurately generate the first L1 P-code signal which tracks the L1 P-code of the GPS signal.

17. The method according to claim 16 wherein the adjusting step is performed only when the encrypting W-code did not change its polarity during the predetermined integration period.

18. The method according to claim 16 wherein the predetermined integration period is substantially equal to that of two bit periods of the encrypting W-code.

19. The method according to claim 16 further comprising the step of:

generating the first threshold value based on an estimated carrier-to-noise (C/No) ratio value of the L1 P-code of the GPS signal.

20. The method according to claim 19 further comprising the step of:

generating the C/No ratio value of the L1 P-code signal based on a signal strength value of the estimated C/A code of the GPS signal.

21. The method according to claim 20 further comprising the step of:

reading the first threshold value from a look-up-table having a plurality of entries, each entry setting forth a respective threshold value for a respective predetermined range of C/No ratio values.

22. The method according to claim 21 wherein the predetermined range of the C/No ratio values for at least a plurality of the entries in the look-up-table is a 1 dB interval.

23. The method according to claim 16 further comprising:

demodulating the GPS signal based on, in part, first and second L2 P-code signals that are locally generated replica signals of the L2 P-code of the GPS signal to thereby generate first and second demodulated L2 P-code signals;

separately integrating the first and second demodulated L2 P-code signals over the predetermined integration period, to thereby generate first and second integrated L2 P-code signals; and adjusting the first L2 P-code signal based on the first and second integrated L2 P-code signals and based on whether the encrypting W-code changed its polarity during the integration period, to thereby accurately generate the first L2 P-code signal which tracks the L2 P-code of the GPS signal.

24. The method according to claim 23 wherein the adjusting the first L2 P-code signal step is performed only when the predetermined encrypting W-code did not change its polarity during the integration period.

25. The method according to claim 23 further comprising the steps of:

demodulating the GPS signal based on, in part, the first and second L2 P-code signals to thereby generate third and fourth demodulated L2 P-code signals; and separately integrating the third and fourth demodulated L2 P-code signals over the predetermined integration period, to thereby generate third and fourth integrated L2 signals.

26. The method according to claim 25 further comprising the steps of:

determining whether a local L2 carrier signal has locked onto a L2 carrier of the GPS signal; and if the local L2 carrier signal has not locked on to the L2 carrier of the GPS signal, then adjusting the first L2 P-code signal based on the first, second, third and fourth integrated L2 signals and based on whether the encrypting W-code changed its polarity during the predetermined integration period.

27. The method according to claim 16 further comprising the step of:

demodulating the GPS signal based on, in part, first and second L2 P-code signals that are locally generated replica signals of the L2 P-code of the GPS signal and a local L2 carrier signal that is a locally generated replica signal of a L2 carrier of the GPS signal, to thereby generate fifth and sixth demodulated L2 P-code signals;

separately integrating the fifth and sixth demodulated L2 P-code signals over the integration period, to thereby generate fifth and sixth integrated L2 P-code signals; and adjusting the local L2 carrier signal based on the fifth and sixth integrated L2 signals and the first integrated L1 signal and based on whether the encrypting W-code changed its polarity during the integration period, to thereby accurately generate the local L2 carrier signal which tracks the L2 carrier of the GPS signal.

28. The method according to claim 27 further comprising the steps of:

comparing a signal derived from the first integrated L1 P-code signal and the fifth integrated L2 P-code signal to a second predetermined threshold value to determine whether the encrypting W-code changed its polarity during the integration period, to thereby generate a control signal; and adjusting the local L2 carrier signal based on a signal derived from the fifth and sixth integrated L2 signals and the first integrated L1 signal and based on the control signal, to thereby accurately generate the local L2 carrier signal so as to track the L2 carrier of the GPS signal.

* * * * *